United States Patent
Chendamarai Kannan et al.

(10) Patent No.: US 11,696,327 B2
(45) Date of Patent: Jul. 4, 2023

(54) DWELL TIME BASED CHANNEL CONTENTION IN WIRELESS COMMUNICATIONS

(71) Applicant: QUALCOMM Incorporated, San Diego, CA (US)

(72) Inventors: Arumugam Chendamarai Kannan, San Diego, CA (US); Aleksandar Damnjanovic, Del Mar, CA (US); Xiaoxia Zhang, San Diego, CA (US); Vinay Chande, San Diego, CA (US); Srinivas Yerramalli, Hyderabad (IN); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/182,508

(22) Filed: Feb. 23, 2021

(65) Prior Publication Data
US 2021/0266962 A1    Aug. 26, 2021

Related U.S. Application Data

(60) Provisional application No. 62/980,988, filed on Feb. 24, 2020.

(51) Int. Cl.
*H04W 74/08* (2009.01)
(52) U.S. Cl.
CPC ... *H04W 74/0808* (2013.01); *H04W 74/0816* (2013.01)
(58) Field of Classification Search
CPC ............... H04W 74/0808; H04W 74/0816
See application file for complete search history.

(56) References Cited

U.S. PATENT DOCUMENTS

| | | | |
|---|---|---|---|
| 2018/0027582 A1* | 1/2018 | Yerramalli | H04L 1/1825 |
| | | | 370/336 |
| 2019/0037600 A1 | 1/2019 | Urabayashi | |

(Continued)

OTHER PUBLICATIONS

Ericsson: "On the LS from ETSI BRAN", 3GPP Draft, R1-1901003, 3GPP TSG-RAN WG1 Meeting Ad Hoc 1901, On the LS from ETSI BRAN, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593848, 3 Pages, Retrieved from the Internet: URL: http://www.3gpp.org/ftp/Meetings%5F3GPP%5FSYNC/RAN1/Docs/R1%2D1901003%2Ezip. [retrieved on Jan. 20, 2019] section 2.

(Continued)

*Primary Examiner* — Pao Sinkantarakorn
*Assistant Examiner* — Kabir U Jahangir
(74) *Attorney, Agent, or Firm* — Holland & Hart LLP

(57) ABSTRACT

Methods, systems, and devices for wireless communications are described in which a transmitting device using shared radio frequency spectrum may perform a listen before talk (LBT) procedure for at least a minimum dwell time and, upon successful completion of the LBT procedure, may occupy the spectrum for up to a duration of a channel occupancy time (COT). The transmitting device may discontinue transmitting during the COT for a gap period, and resume transmitting subsequent to the gap period without performing another LBT procedure. The minimum dwell time may be based on a periodicity of a channel reservation signal transmitted by one or more other devices using the shared radio frequency spectrum. In some cases, the transmitting device may schedule one or more receiving devices with resources for transmissions during the COT, and the receiving devices may perform a LBT that is non-adjacent with an associated transmission.

27 Claims, 24 Drawing Sheets

(56) References Cited

U.S. PATENT DOCUMENTS

| | | | | |
|---|---|---|---|---|
| 2019/0246411 | A1* | 8/2019 | Kim | H04L 5/001 |
| 2020/0084759 | A1* | 3/2020 | Liu | H04W 72/082 |
| 2020/0322982 | A1* | 10/2020 | Wu | H04W 16/14 |
| 2021/0345407 | A1* | 11/2021 | Myung | H04L 27/2607 |
| 2021/0376963 | A1* | 12/2021 | Liang | H04L 1/1861 |
| 2021/0392680 | A1* | 12/2021 | Wang | H04W 16/14 |
| 2022/0014314 | A1* | 1/2022 | Wang | H04L 5/0053 |
| 2022/0167404 | A1* | 5/2022 | Park | H04W 74/0808 |

OTHER PUBLICATIONS

Interdigital Inc: "On LBT for Beam-Based Transmission for NR-U", 3GPP Draft, 3GPP TSG RAN WG1 Meeting #92bis, R1-1804885 On LBT for Beam-Based Transmission for NR-U, 3rd Generation Partnership Project (3GPP), Mobile Competence Centre, 650, Route Des Lucioles, F-06921 Sophia-Antipolis Cedex, FRA , vol. RAN WG1, No. Sanya, China, Apr. 16, 2018-Apr. 20, 2018, Apr. 15, 2018 (Apr. 15, 2018), XP051427148, 6 Pages, Retrieved from the Internet: URL: http://www.3gpp.org/ftp/Meetings%5F3GPP%5FSYNC/ RAN1/Docs/, [retrieved on Apr. 15, 2018], Chapters 1, 2, section 1-2, p. 1-5.

International Search Report and Written Opinion—PCT/US2021/019421—ISA/EPO—dated Jun. 17, 2021.

Lenovo, et al., "LBT Impact to Multi-PUSCH Scheduling", 3GPP Draft, 3GPP TSG-RAN WG2 Meeting #108, R2-1915103, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 7, 2019 (Nov. 7, 2019), XP051815803, 3 Pages, Retrieved from the Internet: URL: https://ftp.3gpp.org/tsg_ran/WG2_RL2/TSGR2_108/Docs/R2-1915103.zip. R2-1915103.doc [retrieved on Nov. 7, 2019] section 2.

Qualcomm Incorporated: "Channel Access Procedures for NR Unlicensed", 3GPP Draft, 3GPP TSG RAN WG1 Meeting #99, R1-1912938, Reno, USA, Nov. 18-Nov. 22, 2019, Nov. 8, 2019 (Nov. 8, 2019), XP051823701, Retrieved from the Internet: URL: https://ftp.3gpp.org/tsg_ran/WG1_RL1/TSGR1_99/Docs/R1-1912938.zip. R1-1912938 7.2.2.2.1 Channel access procedures for NR unlicensed.docx [retrieved on Nov. 9, 2019] section 2.1, Proposal 7 the Whole Document pp. 1-18, chapter 2.2.

* cited by examiner

DWELL TIME BASED CHANNEL CONTENTION IN WIRELESS COMMUNICATIONS

CROSS REFERENCE

The present application for patent claims the benefit of U.S. Provisional Patent Application No. 62/980,988 by CHENDAMARAI KANNAN et al., entitled "DWELL TIME BASED CHANNEL CONTENTION IN WIRELESS COMMUNICATIONS," filed Feb. 24, 2020, assigned to the assignee hereof, and expressly incorporated by reference in its entirety herein.

FIELD OF TECHNOLOGY

The following relates generally to wireless communications and more specifically to dwell time based channel contention in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, wireless communications systems may use shared radio frequency spectrum in which a device that is to transmit performs a contention-based channel access procedure, such as a listen before talk (LBT) procedure (e.g., a clear channel assessment (CCA)), to confirm that a desired radio frequency spectrum band is not currently being used by another transmitter, prior to transmitting using the desired radio frequency spectrum band (e.g., a selected wireless channel within the shared radio frequency spectrum). Further, in some cases, the shared radio frequency spectrum may be in relatively high frequency bands (e.g., millimeter wave (mmW) frequency bands), in which signals from a transmitting device may experience relatively fast signal attenuation, which may result in a potentially interfering device not detecting sufficient energy in a LBT procedure to prevent the interfering device from initiating a transmission. In cases where the interfering device is in proximity to a receiving device that is to receive communications from the transmitting device, a transmission by the potentially interfering device may interfere with the communications from the transmitting device. Techniques to efficiently reduce such potentially interfering device transmissions would therefore be desirable.

SUMMARY

A method of wireless communications is described. The method may include gaining channel access to a wireless channel in a shared radio frequency spectrum based on a first listen before talk (LBT) procedure that indicates the wireless channel is unused by one or more other transmitters, where the first LBT procedure provides the channel access for a maximum channel occupancy time (COT) duration, transmitting, responsive to gaining the channel access, a first communication to one or more receiving devices via the wireless channel during the maximum COT duration, discontinuing transmitting via the wireless channel subsequent to the first communication for at least a duration of a transmission gap, and transmitting, subsequent to the transmission gap and in an absence of a second LBT procedure, a second communication to the one or more receiving devices during the maximum COT duration.

An apparatus for wireless communications is described. The apparatus may include a processor, memory coupled with the processor, and instructions stored in the memory. The instructions may be executable by the processor to cause the apparatus to gain channel access to a wireless channel in a shared radio frequency spectrum based on a first LBT procedure that indicates the wireless channel is unused by one or more other transmitters, where the first LBT procedure provides the channel access for a maximum COT duration, transmit, responsive to gaining the channel access, a first communication to one or more receiving devices via the wireless channel during the maximum COT duration, discontinue transmitting via the wireless channel subsequent to the first communication for at least a duration of a transmission gap, and transmit, subsequent to the transmission gap and in an absence of a second LBT procedure, a second communication to the one or more receiving devices during the maximum COT duration.

Another apparatus for wireless communications is described. The apparatus may include means for gaining channel access to a wireless channel in a shared radio frequency spectrum based on a first LBT procedure that indicates the wireless channel is unused by one or more other transmitters, where the first LBT procedure provides the channel access for a maximum COT duration, transmitting, responsive to gaining the channel access, a first communication to one or more receiving devices via the wireless channel during the maximum COT duration, discontinuing transmitting via the wireless channel subsequent to the first communication for at least a duration of a transmission gap, and transmitting, subsequent to the transmission gap and in an absence of a second LBT procedure, a second communication to the one or more receiving devices during the maximum COT duration.

A non-transitory computer-readable medium storing code for wireless communications is described. The code may include instructions executable by a processor to gain channel access to a wireless channel in a shared radio frequency spectrum based on a first LBT procedure that indicates the wireless channel is unused by one or more other transmitters, where the first LBT procedure provides the channel access for a maximum COT duration, transmit, responsive to gaining the channel access, a first communication to one or more receiving devices via the wireless channel during the maximum COT duration, discontinue transmitting via the wireless channel subsequent to the first communication for at least a duration of a transmission gap, and transmit, subsequent to the transmission gap and in an absence of a second LBT procedure, a second communication to the one or more receiving devices during the maximum COT duration.

A method of wireless communications at a first wireless device is described. The method may include gaining channel access to a wireless channel in a shared radio frequency spectrum based on a first LBT procedure that indicates the wireless channel is unused by one or more other transmitters, where the first LBT procedure provides the channel access for a COT duration, scheduling at least a second wireless device to transmit during a first portion of the COT duration based on a second LBT procedure that is associated with the COT duration, and receiving one or more transmissions from the second wireless device during the COT duration.

An apparatus for wireless communications at a first wireless device is described. The apparatus may include a processor, memory coupled with the processor, and instructions stored in the memory. The instructions may be executable by the processor to cause the apparatus to gain channel access to a wireless channel in a shared radio frequency spectrum based on a first LBT procedure that indicates the wireless channel is unused by one or more other transmitters, where the first LBT procedure provides the channel access for a COT duration, schedule at least a second wireless device to transmit during a first portion of the COT duration based on a second LBT procedure that is associated with the COT duration, and receive one or more transmissions from the second wireless device during the COT duration.

Another apparatus for wireless communications at a first wireless device is described. The apparatus may include means for gaining channel access to a wireless channel in a shared radio frequency spectrum based on a first LBT procedure that indicates the wireless channel is unused by one or more other transmitters, where the first LBT procedure provides the channel access for a COT duration, scheduling at least a second wireless device to transmit during a first portion of the COT duration based on a second LBT procedure that is associated with the COT duration, and receiving one or more transmissions from the second wireless device during the COT duration.

A non-transitory computer-readable medium storing code for wireless communications at a first wireless device is described. The code may include instructions executable by a processor to gain channel access to a wireless channel in a shared radio frequency spectrum based on a first LBT procedure that indicates the wireless channel is unused by one or more other transmitters, where the first LBT procedure provides the channel access for a COT duration, schedule at least a second wireless device to transmit during a first portion of the COT duration based on a second LBT procedure that is associated with the COT duration, and receive one or more transmissions from the second wireless device during the COT duration.

A method of wireless communications at a second wireless device is described. The method may include receiving, from a first wireless device that has obtained channel access to a wireless channel in a shared radio frequency spectrum, schedule information that indicates a first portion of a COT duration is to be used for a communication of the second wireless device via the wireless channel, performing an LBT procedure for at least a minimum dwell time based on the schedule information to determine that the wireless channel is unused by one or more other transmitters, and transmitting the communication responsive to the performing the LBT procedure.

An apparatus for wireless communications at a second wireless device is described. The apparatus may include a processor, memory coupled with the processor, and instructions stored in the memory. The instructions may be executable by the processor to cause the apparatus to receive, from a first wireless device that has obtained channel access to a wireless channel in a shared radio frequency spectrum, schedule information that indicates a first portion of a COT duration is to be used for a communication of the second wireless device via the wireless channel, perform an LBT procedure for at least a minimum dwell time based on the schedule information to determine that the wireless channel is unused by one or more other transmitters, and transmit the communication responsive to the performing the LBT procedure.

Another apparatus for wireless communications at a second wireless device is described. The apparatus may include means for receiving, from a first wireless device that has obtained channel access to a wireless channel in a shared radio frequency spectrum, schedule information that indicates a first portion of a COT duration is to be used for a communication of the second wireless device via the wireless channel, performing an LBT procedure for at least a minimum dwell time based on the schedule information to determine that the wireless channel is unused by one or more other transmitters, and transmitting the communication responsive to the performing the LBT procedure.

A non-transitory computer-readable medium storing code for wireless communications at a second wireless device is described. The code may include instructions executable by a processor to receive, from a first wireless device that has obtained channel access to a wireless channel in a shared radio frequency spectrum, schedule information that indicates a first portion of a COT duration is to be used for a communication of the second wireless device via the wireless channel, perform an LBT procedure for at least a minimum dwell time based on the schedule information to determine that the wireless channel is unused by one or more other transmitters, and transmit the communication responsive to the performing the LBT procedure.

DETAILED DESCRIPTION

Figure 1:
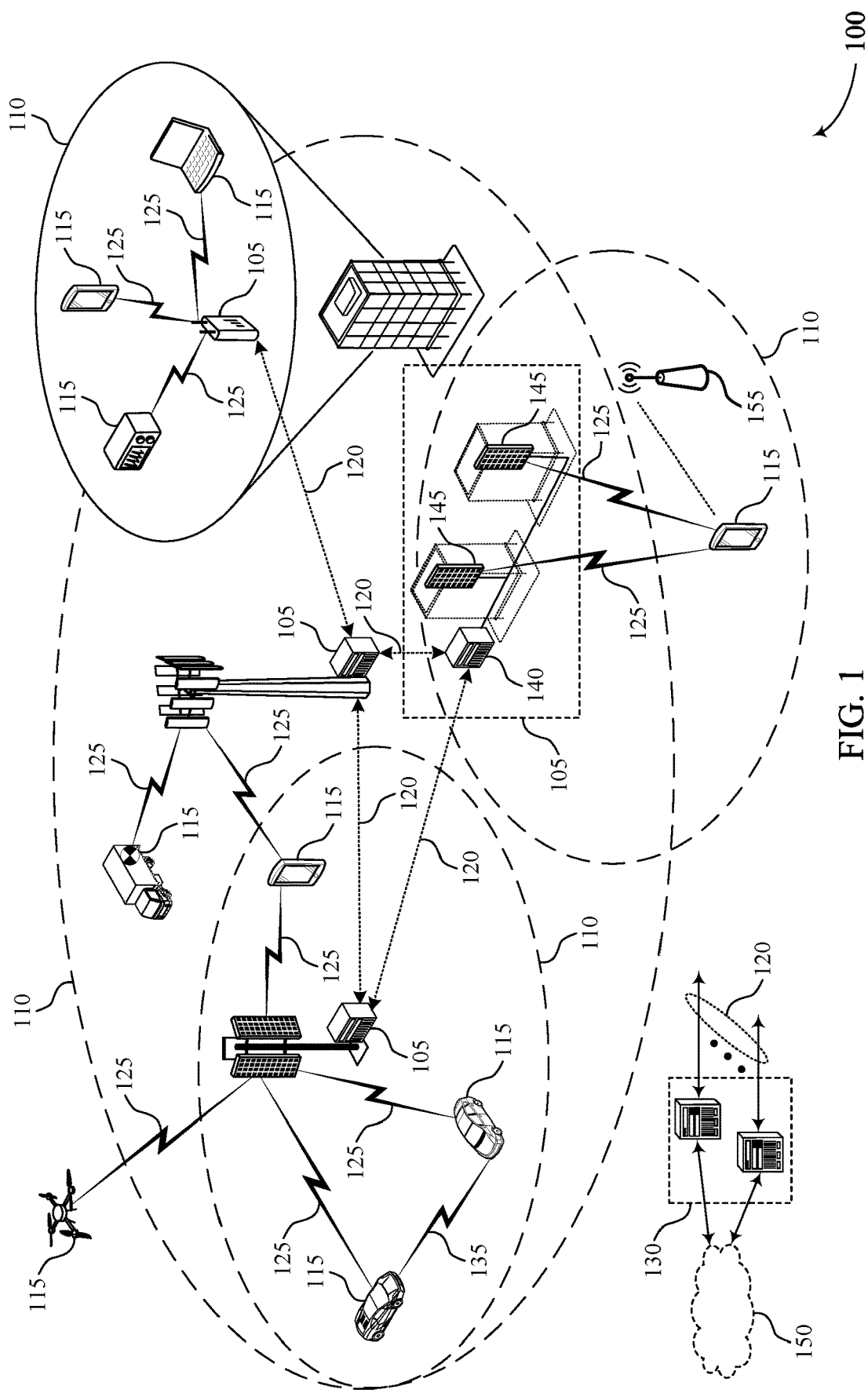
FIG. 1 illustrates an example of a system for wireless communications that supports dwell time based channel contention in wireless communications in accordance with aspects of the present disclosure.

In some deployments, wireless communications systems may operate in millimeter wave (mmW) frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a user equipment (UE)) may be beamformed. Moreover, a receiving device may use beamforming techniques to configure antenna(s) and/or antenna array(s) and/or antenna array module(s) such that transmissions are received in a directional manner.

Further, in some cases, wireless communications systems may use shared radio frequency spectrum in which a device that is to transmit, such as a base station performs a contention-based channel access procedure, such as a listen before talk (LBT) procedure (e.g., a clear channel assessment (CCA)), to confirm that a radio frequency spectrum band is currently unused prior to transmitting using the radio frequency spectrum band. In cases where the shared radio frequency spectrum uses a mmW frequency band that uses beamformed communications, a potentially interfering node may not detect transmissions from the base station due to, for example, signal attenuation resulting in received energy at the potentially interfering node being below a LBT threshold, beamforming resulting in the potentially interfering node not detecting energy from the base station, or combinations thereof. In cases where the interfering node is in proximity to a UE that is to receive downlink communications from the base station, a transmission by the potentially interfering node may interfere with the downlink communications from the base station.

Various techniques as discussed herein provide for channel contention and transmission techniques in which a UE (or any other receiving device) may periodically transmit reservation signals during a reception time in which the UE receives downlink communications. Such reservation signals may efficiently reduce potentially interfering transmissions from an interfering node. In some cases, each device that uses the shared radio frequency spectrum may perform a LBT procedure for at least a minimum dwell time that corresponds to the periodicity of the reservation signals (e.g., a minimum contention window for a CCA procedure may be set to the periodicity of configured reservation signals). In some cases, an interfering node may be notified that reservation signals are being used and adjust its LBT procedures accordingly, and thus transmitting nodes in proximity to the base station or UE may detect the reservation signal and avoid transmitting using the shared radio frequency spectrum.

In some cases, a transmitting device, such as a base station, in a shared radio frequency spectrum band may perform a LBT procedure on a wireless channel for at least the minimum dwell time and, upon successful completion of the LBT procedure, may occupy the wireless channel for up to a duration of a maximum channel occupancy time (COT). In some cases, the transmitting device may discontinue transmitting during the maximum COT for a gap period, and resume transmitting subsequent to the gap period without performing another LBT procedure. In some cases, a threshold gap period may be defined, and the transmitting device may perform an abbreviated LBT procedure in the event that the gap period meets or exceeds the threshold gap period. In some cases, the minimum dwell time is based on a periodicity of the reservation signal that may be transmitted by one or more devices using the shared radio frequency spectrum during active communications. In some cases, the LBT procedure may be performed using a sensing beam, and beamforming parameters for one or more transmit beams may be determined based on the sensing beam.

Additionally or alternatively, the transmitting device may schedule one or more receiving devices with resources for transmissions during the COT. In such cases, the transmitting device may perform a LBT procedure and obtain a wireless channel for a COT, and may transmit scheduling information to the one or more receiving devices that indicates associated resources within the COT. The receiving devices may, receive the scheduling information, and perform a LBT procedure with a minimum dwell time immediately preceding the scheduled resources, or in advance of the scheduled resources. In some cases, the scheduling information may indicate when the one or more receiving devices are to perform the LBT procedure, or may indicate a window during which the receiving devices are to perform the LBT procedure. In some cases, the minimum dwell time is based on a periodicity of a channel reservation signal that may be transmitted by one or more devices using the shared radio frequency spectrum during active communications. In some cases, the LBT procedure may be performed using a sensing beam, and beamforming parameters for one or more transmit beams may be determined based on the sensing beam.

Such techniques may provide one or more advantages in systems that utilize shared radio frequency spectrum. For example, by allowing a transmitting device to transmit following one of more transmission gaps without performing a new LBT procedure, efficiency of resource usage in the system may be enhanced through reduction of overhead associated with LBT procedures. Wireless resource efficiency may be further enhanced by scheduling of devices to transmit during a COT and perform an associated LBT procedure in advance of the scheduled transmission, which may allow multiple devices to concurrently perform contention-based channel access. Further, by transmitting reservation signals at a periodicity that corresponds to a minimum dwell time of the LBT procedures, potential interference at receiving devices may be reduced due to potentially interfering devices sensing the reservation signals. Additionally, beamforming parameter selection based on a beam used for sensing during a LBT procedure may reduce instances where the transmitting device may interfere with undetected receiving devices that may be using the shared radio frequency spectrum.

Aspects of the disclosure are initially described in the context of wireless communications systems. Wireless resources for downlink communications and silencing signal transmissions, and process flows, are then discussed. Aspects of the disclosure are further illustrated by and described with reference to apparatus diagrams, system diagrams, and flowcharts that relate to dwell time based channel contention in wireless communications.

FIG. 1 illustrates an example of a wireless communications system 100 that supports dwell time based channel contention in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples. In some examples, a shared radio frequency spectrum band may include a licensed radio frequency spectrum band, an unlicensed radio frequency spectrum, or a combination of licensed and unlicensed radio frequency spectrum bands.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, as discussed herein, beamformed communications may use mmW frequencies in a shared radio frequency spectrum band, which may result in a potential interfering node 155 that is in proximity with a receiving device (e.g., a UE 115) not detecting a signal from a transmitter (e.g., a base station 105) that is in communication with the receiving device (e.g., due to signal attenuation, being outside of the beam used by the transmitter and receiving device, etc.). In some cases, in order to prevent signals from such an interfering node 155, techniques as discussed herein may be used to provide for silencing signal transmissions from a UE 115 (or any other device), and a minimum dwell time for LBT procedures of devices that use the shared radio frequency spectrum band. Such silencing signals can efficiently reduce potentially interfering transmissions from an interfering node 155.

In some cases, a transmitting device (e.g., a base station 105, UE 115, and potential interfering node 155) that uses the shared radio frequency spectrum band may perform a LBT procedure on a wireless channel for at least the minimum dwell time and, upon successful completion of the LBT procedure, may occupy the wireless channel for up to a duration of a maximum COT. In some cases, the transmitting device may discontinue transmitting during the maximum COT for a gap period, and resume transmitting subsequent to the gap period without performing another LBT procedure. In some cases, a threshold gap period may be defined, and the transmitting device may perform an abbreviated LBT procedure (e.g., a LBT with a fixed contention window that corresponds to the minimum dwell time) in the event that the gap period meets or exceeds the threshold gap period. In some cases, the minimum dwell time is based on a periodicity of the channel reservation signal. In some cases, the LBT procedure may be performed using a sensing beam, and beamforming parameters for one or more transmit beams may be determined based on the sensing beam.

Additionally or alternatively, the transmitting device may schedule one or more receiving devices with resources for transmissions during the COT. In such cases, the transmitting device may perform a LBT procedure and obtain a wireless channel for a COT, and may transmit scheduling information to the one or more receiving devices that indicates associated resources within the COT. The receiving devices may, receive the scheduling information, and perform a LBT procedure with a minimum dwell time immediately preceding the scheduled resources, or in advance of the scheduled resources. In some cases, the scheduling information may indicate when the one or more receiving devices are to perform the LBT procedure, or may indicate a window during which the receiving devices are to perform the LBT procedure. In some cases, the minimum dwell time is based on a periodicity of a channel reservation signal that may be transmitted by one or more devices using the shared radio frequency spectrum during active communications. In some cases, the LBT procedure may be performed using a sensing beam, and beamforming parameters for one or more transmit beams may be determined based on the sensing beam.

Figure 2:
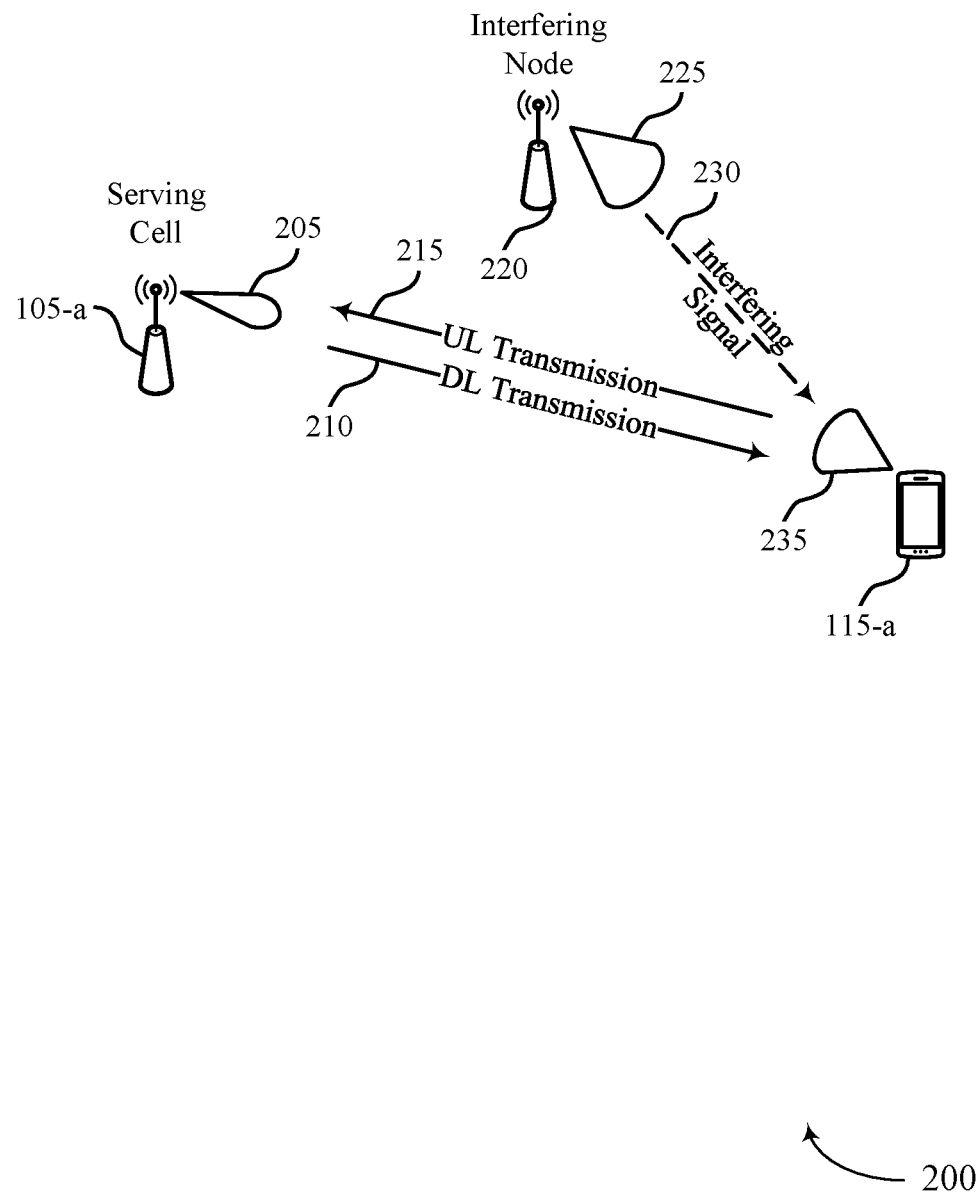
FIG. 2 illustrates an example of a portion of a wireless communications system that supports dwell time based channel contention in wireless communications in accordance with aspects of the present disclosure.

FIG. 2 illustrates an example of a wireless communications system 200 that supports dwell time based channel contention in wireless communications in accordance with aspects of the present disclosure. In some examples, wireless communications system 200 may implement aspects of wireless communications system 100. For instance, wireless communications system 200 may include UE 115-*a* and base station 105-*a* that provides a serving cell for the UE 115-*a*, and an interfering node 220. The UE 115-*a* and base station 105-*a* may be examples of a UE 115 and a base station 105, respectively, as described with reference to FIG. 1, that operate in a shared radio frequency spectrum band. Further, the interfering node 220 may be an example of a base station 105 of FIG. 1 (e.g., a base station 105 of another operator), or may be any other type of transmitter that uses shared radio frequency spectrum that overlaps with the radio frequency spectrum band of the UE 115-*a* and base station 105-*a*.

Base station 105-*a* may use a downlink beam 205 to transmit downlink communications 210 to the UE 115-*a*, and UE 115-*a* may use an uplink beam 235 to transmit uplink communications 215 to the base station 105-*a*. When initiating the transmission of the downlink communications 210, the base station 105-*a* may perform a contention-based channel access procedure, such as a LBT procedure, to confirm that the shared radio frequency spectrum band is not being used by another transmitter. The interfering node 220, which may be an example of a neighboring node as used herein, may also use the shared radio frequency spectrum for communications and may use interfering node beam 225 to transmit a potentially interfering signal 230. In cases where the interfering node 220 performs a LBT procedure prior to transmitting potentially interfering signal 230 and detects sufficient energy from the downlink communications 210 do determine that the medium is occupied, the interfering node 220 may refrain from transmitting and perform a subsequent LBT procedure based on a contention window (e.g., using a backoff counter that is adjusted in the event that LBT fails) that is used for LBT determinations at the interfering node 220. In such cases, the UE 115-*a* may receive and decode downlink communications 210 using beamforming parameters such as corresponding to a UE receive beam (e.g., a beam that is quasi co-located (QCL) with the transmit beam 205).

In other cases, the interfering node 220 may perform the LBT procedure and determine that the shared radio frequency spectrum band is available for transmissions, and may initiate transmission of the potentially interfering signal 230 using interfering node beam 225. In cases where the base station 105-*a* or UE 115-*a* are not transmitting, such techniques provide for fair access to the shared radio frequency spectrum band. However, in some cases the interfering node 220 may perform a LBT procedure and not detect, for example, downlink communications 210 from the base station 105-*a*. For example, the signal strength of the downlink communications 210 may have attenuated such that the interfering node 220 does not detect sufficient energy to cause an LBT failure. In other cases, due to the directional nature of the downlink communications 210 from the base station 105-*a* to the UE 115-*a*, the interfering node 220 may be outside of a beam path of the downlink communications 210 such that the interfering node 220 does not detect sufficient energy to cause an LBT failure. In such cases, if the interfering node 220 starts transmitting the potentially interfering signal 230, it may result in receive interference at the UE 115-*a* that is sufficient to result in a failed decoding of the downlink communication 210. Such interference may occur, for example, when the interfering node 220 is in proximity to the UE 115-*a* or in cases where the UE 115-*a* is located in or near a beam path between the interfering node 220 and a receiver associated with the interfering node 220.

In order to help prevent such a potentially interfering signal 230 from interfering with downlink communications 210, in accordance with various techniques as discussed herein, the UE 115-*a* may transmit periodic reservation signals that can be used reduce the likelihood that the LBT procedure at the interfering node 220 passes, as will be discussed in more detail with reference to FIG. 3. In some cases, based on the periodicity of the reservation signals, the base station 105-*a* and the interfering node 220 may configure LBT procedures to enhance detection of a reservation signal transmission from the UE 115-*a*, or from one or more other devices that use the shared radio frequency spectrum. In some cases, the LBT procedures may be configured as an extended clear channel assessment (eCCA) in which a minimum contention window, or dwell time, for sensing the wireless channel is set such that the LBT procedure can detect at least one periodically transmitted reservation signal. Thus, in such cases, the UE 115-*a*, as the receiving device of downlink communications 210, provides detection assistance that can enhance the channel sensing mechanism.

Additionally, in some cases, upon a successful LBT procedure, the base station 105-*a* may retain the wireless channel for a duration of a maximum COT irrespective of one or more gaps in transmissions on the wireless channel, as will be discussed in more detail with reference to FIG. 4. Such techniques may be beneficial in mmW communications, in which beamformed transmission and reception leads to relatively few collisions in the first place, so performing multiple LBT procedures may unnecessarily increase channel sensing overheads and lead to inefficient medium use. Additionally or alternatively, the base station 105-*a* may schedule the UE 115-*a* (and optionally one or more other UEs) to transmit uplink communications 215 during the COT, and the UE 115-*a* may perform as associated LBT at a time that is not adjacent to the uplink communications 215, as will be discussed in more detail with reference to FIG. 5. In some cases, a sensing beam may be used when the base station 105-*a* performs the LBT procedure, and the downlink beam 205 may be determined based on the sensing beam, as will be discussed in more detail with respect to FIG. 6.

Figure 3:
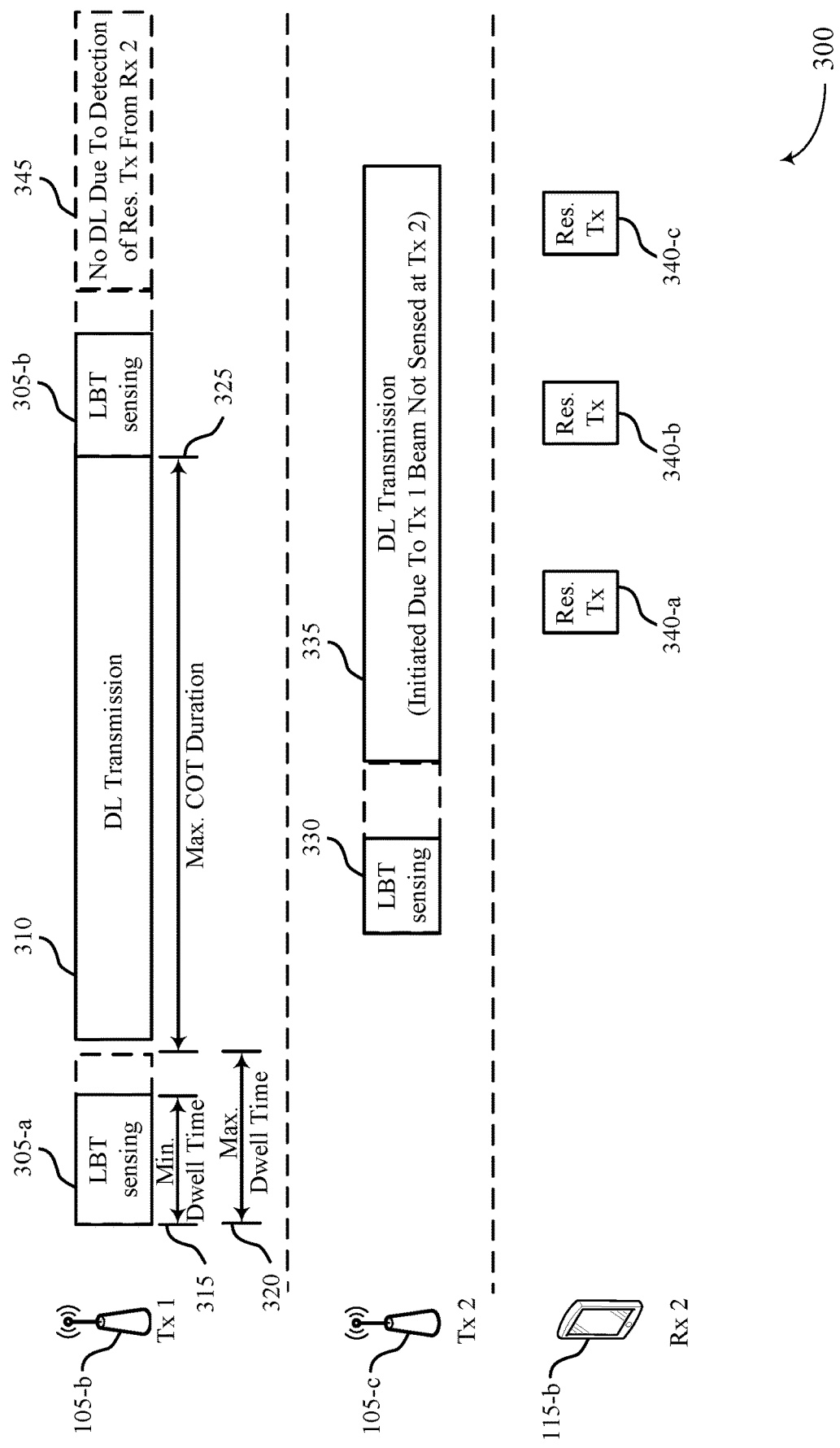
FIG. 3 illustrates an example of a time resources and device transmissions that supports dwell time based channel contention in wireless communications in accordance with aspects of the present disclosure.

FIG. 3 illustrates an example of a time resources and device transmissions 300 that supports dwell time based channel contention in wireless communications in accordance with aspects of the present disclosure. In some examples, time resources and device transmissions 300 may implement aspects of wireless communications system 100 or 200. In this example, a first base station 105-*b*, a second base station 105-*c*, and a UE 115-*b*, which may be examples of base stations 105 and UEs 115, respectively, as described with reference to FIGS. 1 and 2, may communicate using shared radio frequency spectrum.

In this example, the first base station 105-*b* (or any other type of first transmitting device) may perform channel sensing such as a first LBT sensing 305-*a* associated with a LBT procedure to confirm that the shared radio frequency spectrum is available for transmissions. Following a successful first LBT sensing 305-*a*, the base station 105-*b* may transmit downlink transmission 310, after which the first base station 105-*b* may perform a second LBT sensing 305-*b*. In accordance with various techniques discussed herein, the first LBT sensing 305-*a* may be part of an extended clear channel assessment (eCCA) procedure that has a minimum dwell time 315, and a maximum dwell time 320. The minimum dwell time 315 may correspond to a periodicity of reservation signals 340 that may be transmitted by UE 115-*b* (or other receiving device), as discussed herein. Further, upon successful completion of the LBT procedure, the first base station 105-*b* may occupy the wireless channel for a maximum COT duration 325. In some cases, the first base station 105-*b* may configure the minimum dwell time 315, maximum dwell time 320, the maximum COT duration 325, or combinations thereof.

In some cases, the first base station 105-*a* may communicate one or more of the minimum dwell time 315, maximum dwell time 320, the maximum COT duration 325, configuration for channel reservation signals 340, or combinations thereof, to one or more other base stations 105 including second base station 105-*c*, to one or more served UEs 115, or combinations thereof. The second base station 105-*c*, in some cases, may communicate the minimum dwell time 315, maximum dwell time 320, the maximum COT duration 325, configuration for channel reservation signals 340, or combinations thereof, to the UE 115-*b* (e.g., via radio resource control (RRC) signaling, via broadcast information such as in a MIB, SIB, or RMSI, in medium access control (MAC) control element, or any combinations thereof). In some cases, these parameters may be provided by a network (e.g., a core network in communication with the base stations 105, and the base station 105 may configure served UEs 115). Additionally or alternatively, one or more of such parameters may be predetermined or prespecified at devices that use the shared radio frequency spectrum band.

In the example of FIG. 3, the second base station 105-*a* may perform a LBT procedure with LBT sensing 330. In this example, due to signal attenuation or a beam width of the downlink transmission 310, the second base station 105-*c* may not sense the downlink transmission 310, and may initiate its own downlink transmission 335. The UE 115-*b*, upon initiation of the downlink transmission 335, may transmit periodic reservation signals 340. In the example of FIG. 3, the first base station 105-*b* may sense one of the reservation signals 340 during the second LBT sensing 305-*b*, and determine that another transmitter is using the wireless channel, and not transmit downlink communications, as indicated at 345. Thus, for a first portion of the downlink transmission 335, the UE 115-*b* may experience some amount of interference from the first base station 105-*b*, which will drop at the end of the maximum COT duration 325. Accordingly, such a technique allows for efficient spectrum usage while providing protection of the receiving UE 115-*b* that prevents sustained interference from the first base station 105-*b*.

In some cases, prior to starting the downlink transmission 335, the second base station 105-*c* may configure the UE 115-*b* for reservation signal 340 (which may also be referred to as blocking signals or silencing signals) transmissions. In some cases, the configuration may be provided in response to the UE 115-*b* or second base station 105-*c* determining that a potentially interfering node is present. In some cases, the reservation signal configuration may indicate a format and resources for the reservation signals 340. For example, the second base station 105-*c* may provide resources to transmit the reservation signals 340 (e.g., a starting slot, a starting symbol, periodicity of transmissions, ending symbol, etc.). In some cases, the configuration information for the reservation signals 340 may be provided in RRC signaling, in a medium access control (MAC) control element (CE), in dynamic downlink control information (DCI) that provides a resource allocation for the downlink transmission 335, or any combinations thereof. Additionally or alternatively, the reservation signal configuration may provide a format of the reservation signals 340, such as, for example, a transmission bandwidth, scrambling identification, and the like.

In some cases, the reservation signals 340 may be transmitted by the UE 115-*b* using an uplink beam that corresponds to a downlink beam used to receive the downlink transmissions 335. In some cases, the reservation signals 340 may be transmitted on a beam that best blocks downlink transmissions 310, which may help to compensate for the power imbalance between the UE 115-*b* and the first base station 105-*b*. The reservation signal configuration may also include power control information. Thus, in such cases, the UE 115-*b*, as the receiving device of downlink transmissions 335, provides detection assistance that can enhance the channel sensing mechanism.

Figure 4:
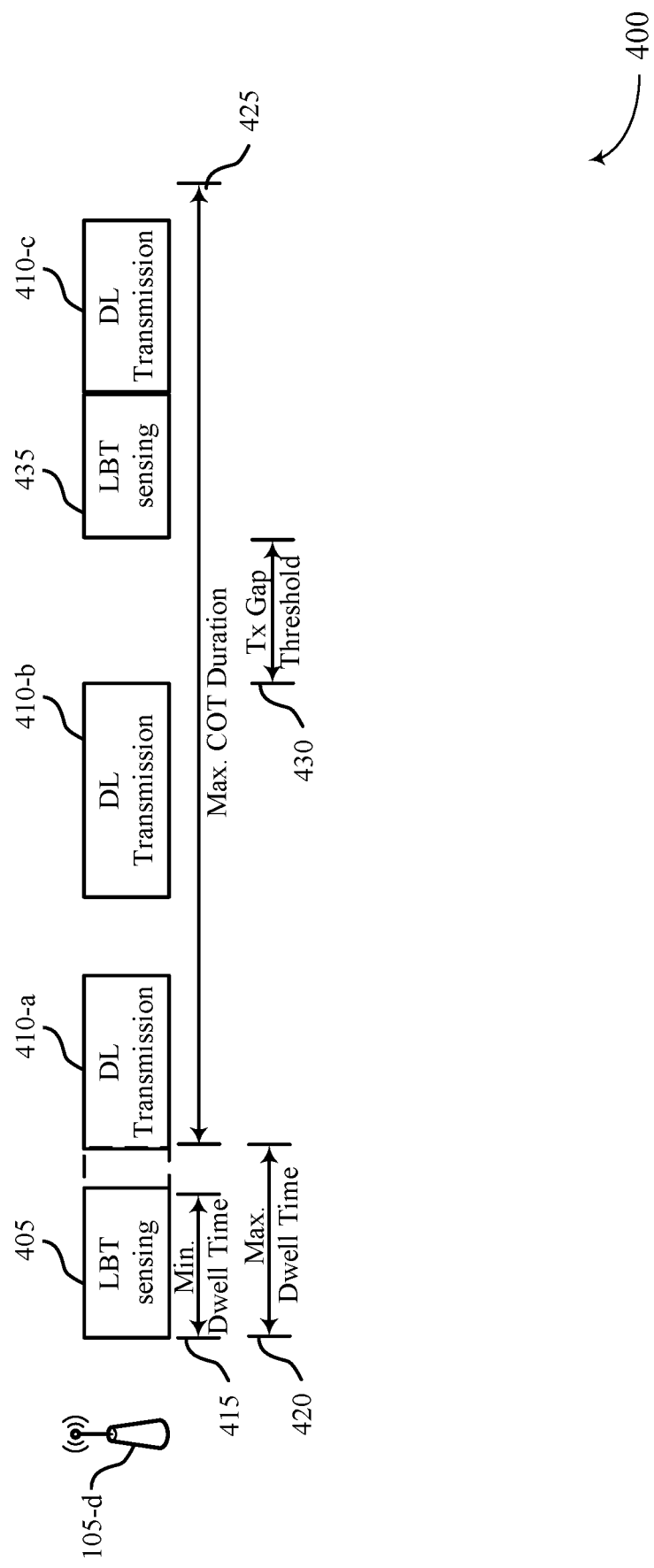
FIG. 4 illustrates an example of a time resources and device transmissions that supports dwell time based channel contention in wireless communications in accordance with aspects of the present disclosure.

FIG. 4 illustrates an example of a time resources and device transmissions 400 that supports dwell time based channel contention in wireless communications in accordance with aspects of the present disclosure. In some examples, time resources and device transmissions 400 may implement aspects of wireless communications system 100 or 200. In this example, a base station 105-*d*, which may be an example of base stations 105 as described with reference to FIGS. 1 through 3, may communicate using shared radio frequency spectrum.

In this example, the base station 105-*c* (or any other type of transmitting device using the shared radio frequency spectrum) may perform channel sensing such as a LBT sensing 405 associated with a LBT procedure to confirm that the shared radio frequency spectrum is available for transmissions. In accordance with various techniques discussed herein, the LBT sensing 405 may be part of an eCCA procedure that has a minimum dwell time 415, and a maximum dwell time 420. The minimum dwell time 415 may correspond to a periodicity of reservation signals that may be transmitted by a receiving device that uses the shared radio frequency spectrum, as discussed herein. Further, upon successful completion of the LBT procedure, the base station 105-*d* may occupy the wireless channel for a maximum COT duration 425. In some cases, the base station 105-*d* may configure the minimum dwell time 415, maximum dwell time 420, the maximum COT duration 425, or combinations thereof (e.g., in broadcast signaling, or in dedicated signaling transmitted to one or more receivers).

As discussed herein, in some cases, the base station 105-*d* may obtain the wireless channel for up to the maximum COT duration 325. In such cases, following successful LBT sensing 405, the base station 105-*d* may transmit a first downlink transmission 410-*a*, and may discontinue transmitting after the first downlink transmission 410-*a*, and may transmit a second downlink transmission 410-*b* following a transmission gap after the first downlink transmission 410-*a*. In some cases, the base station 105-*d* may transmit the second downlink transmission 410-*b* in the absence of a LBT procedure based on transmitting within the maximum COT duration 425. Thus, in such cases, the base station 105-*d* (or any other transmitter that wins contention for the wireless channel after an LBT procedure with the minimum dwell time 415) may have discontinuous transmissions on the wireless channel during the maximum COT duration 425.

In some cases, the base station 105-*d* may transmit at any time during this maximum COT duration 425 with or without gaps, and where the gaps may be of any duration within the maximum COT duration 425. In this sense, such techniques are provide modified frame-based LBT procedures, where that medium sensing is not done necessarily at fixed frame boundaries. In other cases, a transmission gap threshold 430 may be configured (e.g., a gap threshold of Z μsec, which may be configured by the base station 105-*d*, by another node, or by an entity in a core network). In such cases, if a transmission gap is less than the transmission gap threshold 430, such as the gap between the first downlink transmission 410-a and the second downlink transmission 410-b, the base station 105-d may transmit within the maximum COT duration 425 without performing a separate LBT for the second downlink transmission 410-b.

In the event that a transmission gap meets or exceeds the transmission gap threshold 430, such as between the second downlink transmission 410-b and a third downlink transmission 410-c, the base station 105-d may perform a second LBT sensing 435 that has a duration of the minimum dwell time 415. In some cases, the second LBT sensing 435 may be a modified or abbreviated LBT in which the contention window is set to be the minimum dwell time 415 based on the LBT being performed within the maximum COT duration 425. Additionally, LBT procedures performed at the base station 105-d may be performed using a sensing beam, the downlink transmissions 410 may use downlink transmission beams that are based on the sensing beam, as discussed in more detail with reference to FIG. 6. Such techniques may be beneficial in mmW communications, in which beamformed transmission and reception leads to relatively few collisions in the first place, and channel sensing for LBT procedures may be configured to provide efficient sensing while not consuming large amounts of resource overhead, and thus such techniques provide for efficient usage of the shared radio frequency spectrum band.

Figure 5:
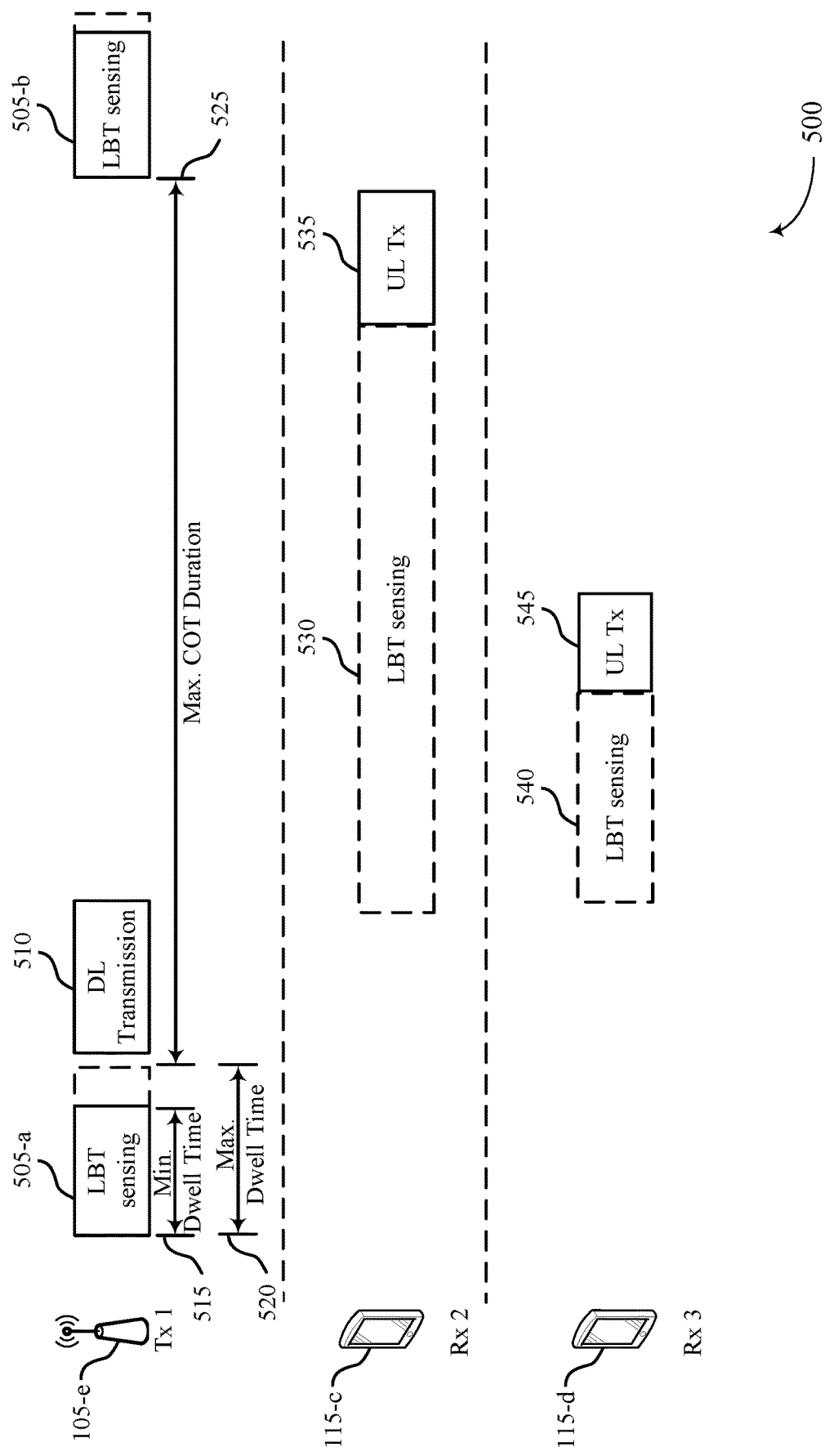
FIG. 5 illustrates an example of a time resources and device transmissions that supports dwell time based channel contention in wireless communications in accordance with aspects of the present disclosure.

FIG. 5 illustrates an example of a time resources and device transmissions 500 that supports dwell time based channel contention in wireless communications in accordance with aspects of the present disclosure. In some examples, time resources and device transmissions 500 may implement aspects of wireless communications system 100 or 200. In this example, a base station 105-e, a first UE 115-c, and a second UE 115-d, which may be examples of base stations 105 and UEs 115, respectively, as described with reference to FIGS. 1 through 4, may communicate using shared radio frequency spectrum.

In this example, the base station 105-e (or any other type of transmitting device) may perform channel sensing such as a first LBT sensing 505-a associated with a LBT procedure to confirm that the shared radio frequency spectrum is available for transmissions. Following a successful first LBT procedure, the base station 105-e may transmit downlink transmission 510. In accordance with various techniques discussed herein, the first LBT sensing 505-a may be part of an eCCA procedure that has a minimum dwell time 515, and a maximum dwell time 520. The minimum dwell time 515 may correspond to a periodicity of reservation signals that may be transmitted by UEs 115 (or other receiving device), as discussed herein. Further, upon successful completion of the LBT procedure, the first base station 105-e may occupy the wireless channel for a maximum COT duration 525, after which the base station 105-e may perform a second LBT sensing 505-b. In some cases, the base station 105-e may configure the minimum dwell time 515, maximum dwell time 520, the maximum COT duration 525, or combinations thereof (e.g., through broadcast signaling, dedicated signaling to each UE 115, or combinations thereof).

In this example, the base station 105-e may scheduling each UE 115 for uplink transmissions within the maximum COT duration 525. In this example, the base station 105-e may schedule the first UE 115-c for a first uplink transmission 535, and may schedule the second UE 115-d for a second uplink transmission 545. In some cases, when the UEs 115 are scheduled within the maximum COT duration 525, the UEs 115 may perform LBT procedures based on the uplink communications being within the maximum COT duration 525. In some cases, each UE 115 may perform a LBT procedure with a minimum dwell time 515 just preceding its corresponding scheduled uplink transmission. In other cases, each UE 115 may perform a LBT procedure with a minimum dwell time 515 at any time prior to its corresponding uplink transmission, but not necessarily immediately before transmission. Thus, in this example, the first UE 115-c may be scheduled for first uplink transmission 535, and may perform LBT sensing 530 at any time prior to the first uplink transmission 535 within the maximum COT duration 525. Likewise, the second UE 115-d may be scheduled for second uplink transmission 545 and may perform LBT sensing 540 at any time prior to the second uplink transmission 545 within the maximum COT duration 525. In other cases, each UE 115 may perform a LBT procedure with a minimum dwell time 515 at a location configured by the base station 105-e (e.g., that is provided along with scheduling information for the uplink transmissions). Such scheduling may allot the base station 105-e to coordinate LBT durations across all of its UEs 115. Further, in some cases, each UE 115 may perform a LBT procedure with a minimum dwell time 515 at any point within a window configured by the base station 105-e (e.g., that is provided with scheduling information to the UEs 115, and allows the base station 105-e to coordinate LBT timing and also provide flexibility to the UEs 115). Such LBT techniques may allow for more flexible scheduling for uplink transmissions by the base station 105-a, because gaps in uplink resources for different UEs 115 may be reduced or eliminated, which may provide for efficient usage of wireless resources.

Figure 6:
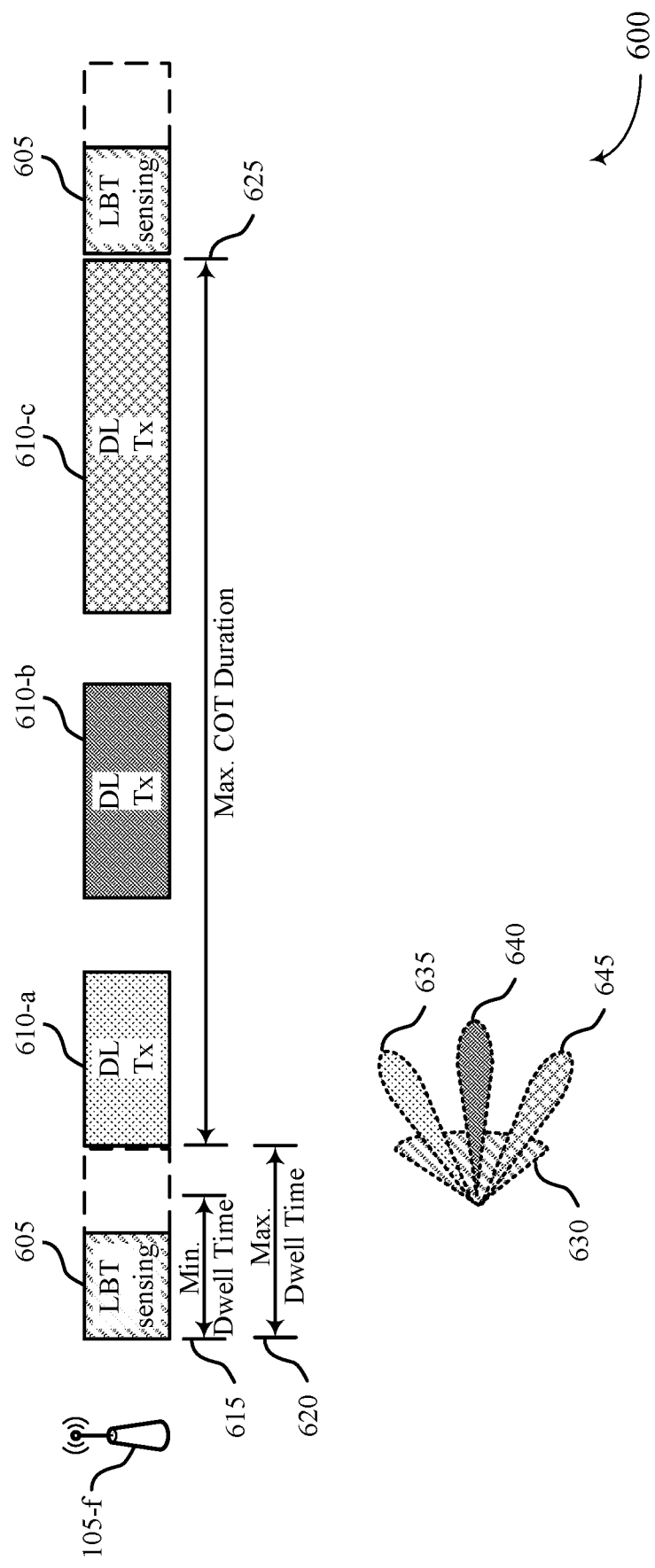
FIG. 6 illustrates an example of a time resources and transmission beams that supports dwell time based channel contention in wireless communications in accordance with aspects of the present disclosure.

FIG. 6 illustrates an example of a time resources and transmission beams 600 that supports dwell time based channel contention in wireless communications in accordance with aspects of the present disclosure. In some examples, time resources and transmission beams 600 may implement aspects of wireless communications system 100. In this example, a base station 105-f, which may be an example of base stations 105 as described with reference to FIGS. 1 through 5, may communicate using shared radio frequency spectrum. It is noted that the examples of FIGS. 3 through 6 may be used in any combinations with each other.

In this example, the base station 105-f (or any other type of transmitting device) may perform channel sensing such as a LBT sensing 605 associated with a LBT procedure to confirm that the shared radio frequency spectrum is available for transmissions. Following a successful LBT procedure, the base station 105-f may transmit downlink transmissions 610. In accordance with various techniques discussed herein, the LBT sensing 605 may be part of an eCCA procedure that has a minimum dwell time 615, and a maximum dwell time 620. The minimum dwell time 615 may correspond to a periodicity of reservation signals that may be transmitted by UEs 115 (or other receiving device), as discussed herein. Further, upon successful completion of the LBT procedure, the first base station 105-f may occupy the wireless channel for a maximum COT duration 625, after which the base station 105-f may perform a second LBT sensing 605. In some cases, the base station 105-f may configure the minimum dwell time 615, maximum dwell time 620, the maximum COT duration 625, or combinations thereof (e.g., through broadcast signaling, dedicated signaling to each UE 115, or combinations thereof).

In this example, the LBT sensing 605 may be performed using a sensing beam 630. Further, different downlink transmissions 610 may be transmitted to different UEs 115 using different transmit beams. In this example, a first downlink transmission 610-a may use a first downlink transmit beam 635 associated with a first UE 115, a second downlink transmission 610-b may use a second downlink transmit beam 640 associated with a second UE 115, and a third downlink transmission 610-c may use a third downlink transmit beam 645 associated with a third UE 115.

In some cases, the downlink transmit beams 635-645 may be selected from a set of permissible beams that are compatible with the sensing beam 630. For example, a set of available transmit beams may be available to the base station 105-f for communications, and a subset of transmit beams may be associated with the sensing beam 630, with the downlink transmit beams 635-645 selected from the subset of transmit beams. In some cases, a codebook of sensing beams and associated downlink transmit beams may be used to determine the subset of transmit beams. In some cases, the base station 105-f may transmit at any time during the maximum COT duration 625 using any available beam, using a power adjustment that is determined as a function of the antenna gain of the sensing beam 630 and transmit beam. In other cases, the base station 105-f may transmit at any time during the maximum COT duration 625 using any available beam, and an energy detection threshold of the sensing beam 630 may be adjusted as a function of the antenna gain of the sensing beam 630 and transmit beams 635-645. Such techniques may allow for efficient LBT detection and corresponding transmission powers that are associated with a sensing beam 630 of the base station 105-f.

Figure 7:
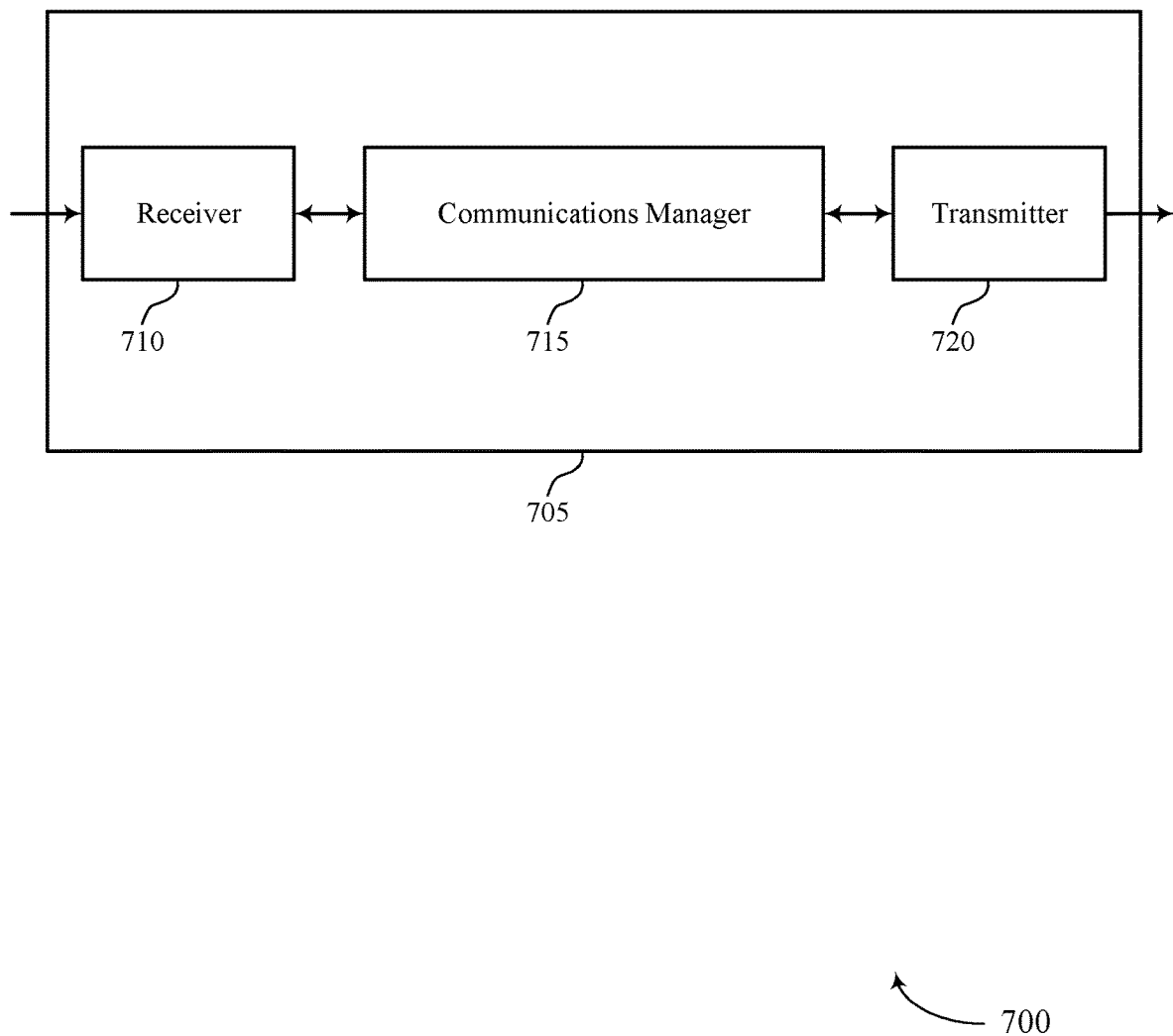
FIGS. 7 and 8 show block diagrams of devices that support dwell time based channel contention in wireless communications in accordance with aspects of the present disclosure.

FIG. 7 shows a block diagram 700 of a device 705 that supports dwell time based channel contention in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to dwell time based channel contention in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a first wireless device that has obtained channel access to a wireless channel in a shared radio frequency spectrum, schedule information that indicates a first portion of a COT duration is to be used for a communication of the second wireless device via the wireless channel, transmit the communication responsive to the performing the LBT procedure, and perform a LBT procedure for at least a minimum dwell time based on the schedule information to determine that the wireless channel is unused by one or more other transmitters. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
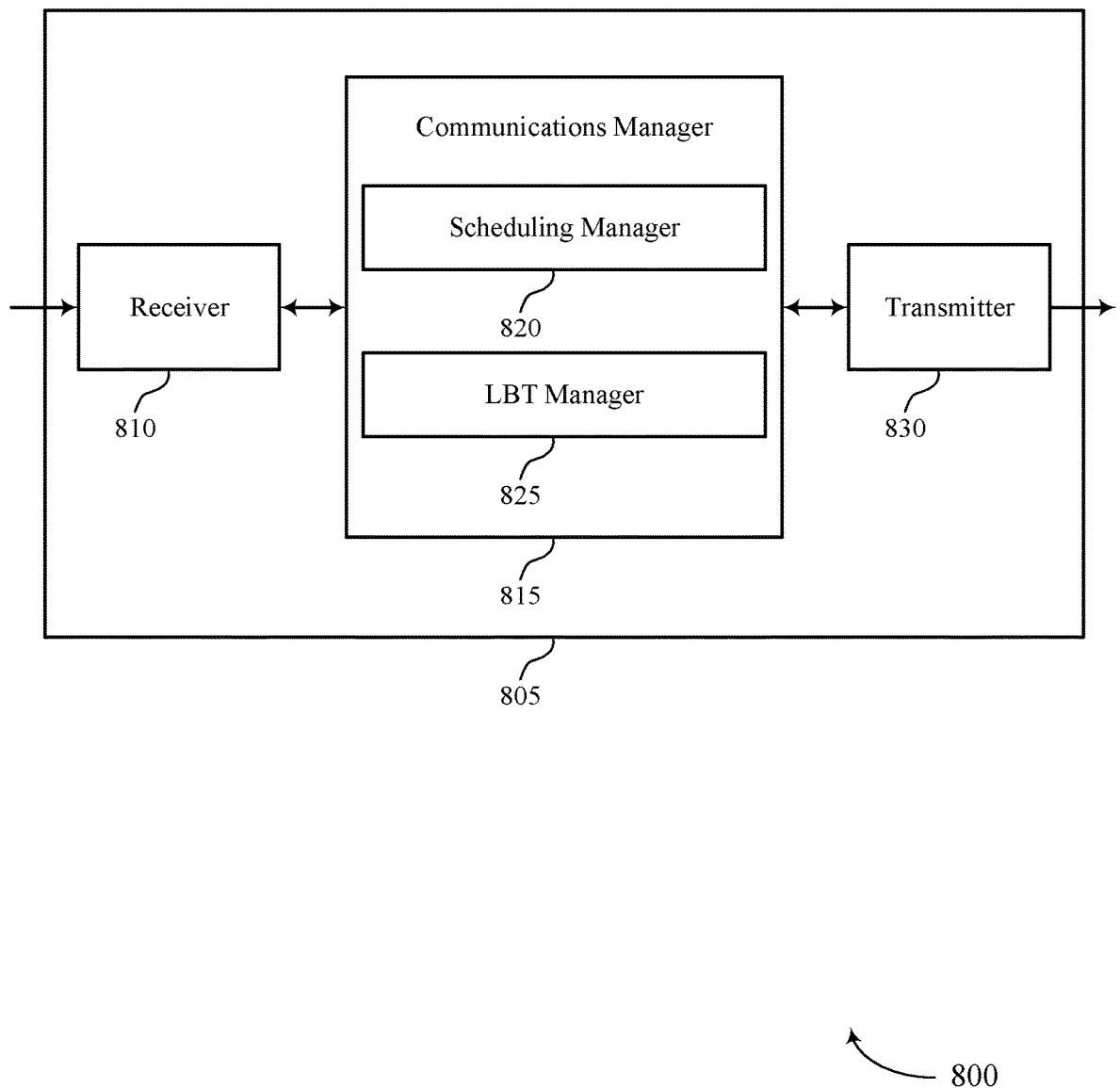

FIG. 8 shows a block diagram 800 of a device 805 that supports dwell time based channel contention in wireless communications in accordance with aspects of the present disclosure. The device 805 may be an example of aspects of a device 705, or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to dwell time based channel contention in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a scheduling manager 820 and a LBT manager 825. The communications manager 815 may be an example of aspects of the communications manager 1010 described herein.

The scheduling manager 820 may receive, from a first wireless device that has obtained channel access to a wireless channel in a shared radio frequency spectrum, schedule information that indicates a first portion of a COT duration is to be used for a communication of the second wireless device via the wireless channel and transmit the communication responsive to the performing the LBT procedure.

The LBT manager 825 may perform a LBT procedure for at least a minimum dwell time based on the schedule information to determine that the wireless channel is unused by one or more other transmitters.

The scheduling manager 820, or its sub-components, may be implemented in hardware, code (e.g., software or firmware) executed by a processor, or any combination thereof. If implemented in code executed by a processor, the functions of the scheduling manager 820, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 820, or its sub-components, may be physically located at various positions, including being distributed such that portions of functions are implemented at different physical locations by one or more physical components. In some examples, the scheduling manager 820, or its sub-components, may be a separate and distinct component in accordance with various aspects of the present disclosure. In some examples, the scheduling manager 820, or its sub-components, may be combined with one or more other hardware components, including but not limited to an I/O component, a transceiver, a network server, another computing device, one or more other components described in the present disclosure, or a combination thereof in accordance with various aspects of the present disclosure.

The LBT manager 825, or its sub-components, may be implemented in hardware, code (e.g., software or firmware) executed by a processor, or any combination thereof. If implemented in code executed by a processor, the functions of the LBT manager 825, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 825, or its sub-components, may be physically located at various positions, including being distributed such that portions of functions are implemented at different physical locations by one or more physical components. In some examples, the LBT manager 825, or its sub-components, may be a separate and distinct component in accordance with various aspects of the present disclosure. In some examples, the LBT manager 825, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
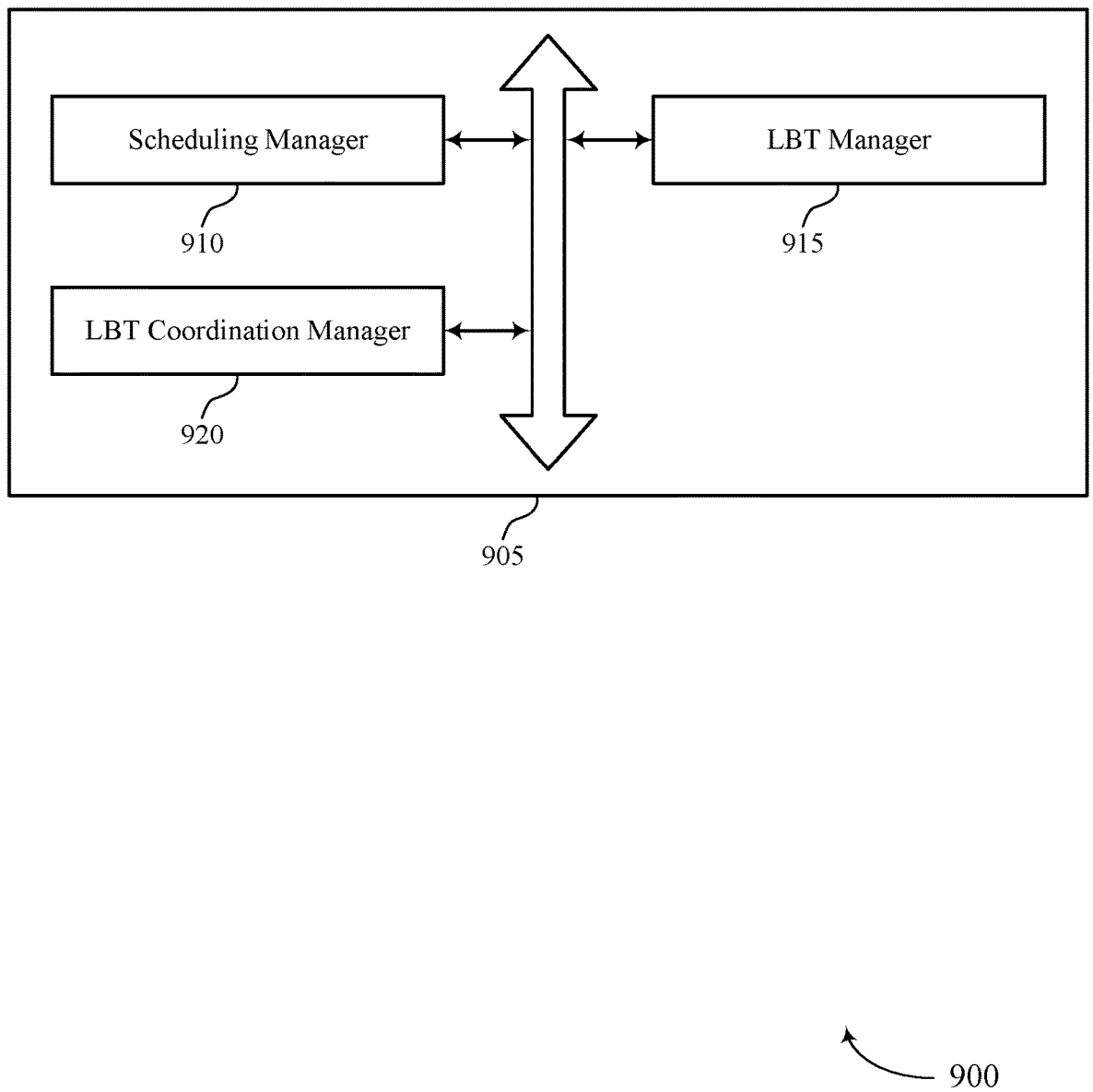
FIG. 9 shows a block diagram of a communications manager that supports dwell time based channel contention in wireless communications in accordance with aspects of the present disclosure.

FIG. 9 shows a block diagram 900 of a communications manager 905 that supports dwell time based channel contention in wireless communications in accordance with aspects of the present disclosure. The communications manager 905 may be an example of aspects of a communications manager 715, a communications manager 815, or a communications manager 1010 described herein. The communications manager 905 may include a scheduling manager 910, a LBT manager 915, and a LBT coordination manager 920. Each of these modules may communicate, directly or indirectly, with one another (e.g., via one or more buses).

The scheduling manager 910 may receive, from a first wireless device that has obtained channel access to a wireless channel in a shared radio frequency spectrum, schedule information that indicates a first portion of a COT duration is to be used for a communication of the second wireless device via the wireless channel. In some examples, the scheduling manager 910 may transmit the communication responsive to the performing the LBT procedure.

The LBT manager 915 may perform a LBT procedure for at least a minimum dwell time based on the schedule information to determine that the wireless channel is unused by one or more other transmitters.

The LBT coordination manager 920 may coordinate LBT parameters with one or more other nodes, such as through scheduling of LBT procedures, or exchange of reservation signal periodicity, a minimum dwell time, a maximum dwell time, a COT duration, or any combinations thereof. In some cases, the LBT procedure is performed at any time after receiving the schedule information and prior to the first portion of the COT duration. In some cases, the schedule information indicates that the second wireless device is to perform the LBT procedure during an identified LBT period prior to the first portion of the COT duration. In some cases, the LBT period is a time window prior to the first portion of the COT duration, and where the LBT procedure can be performed at any time during the time window.

The scheduling manager 910, or its sub-components, may be implemented in hardware, code (e.g., software or firmware) executed by a processor, or any combination thereof. If implemented in code executed by a processor, the functions of the scheduling manager 910, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 910, or its sub-components, may be physically located at various positions, including being distributed such that portions of functions are implemented at different physical locations by one or more physical components. In some examples, the scheduling manager 910, or its sub-components, may be a separate and distinct component in accordance with various aspects of the present disclosure. In some examples, scheduling manager 910, or its sub-components, may be combined with one or more other hardware components, including but not limited to an I/O component, a transceiver, a network server, another computing device, one or more other components described in the present disclosure, or a combination thereof in accordance with various aspects of the present disclosure.

The LBT manager 915, or its sub-components, may be implemented in hardware, code (e.g., software or firmware) executed by a processor, or any combination thereof. If implemented in code executed by a processor, the functions of the LBT manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 915, or its sub-components, may be physically located at various positions, including being distributed such that portions of functions are implemented at different physical locations by one or more physical components. In some examples, the LBT manager 915, or its sub-components, may be a separate and distinct component in accordance with various aspects of the present disclosure. In some examples, the LBT manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The LBT coordination manager 920, or its sub-components, may be implemented in hardware, code (e.g., software or firmware) executed by a processor, or any combination thereof. If implemented in code executed by a processor, the functions of the LBT coordination manager 920, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT coordination manager 920, or its sub-components, may be physically located at various positions, including being distributed such that portions of functions are implemented at different physical locations by one or more physical components. In some examples, the LBT coordination manager 920, or its sub-components, may be a separate and distinct component in accordance with various aspects of the present disclosure. In some examples, the LBT coordination manager 920, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 10:
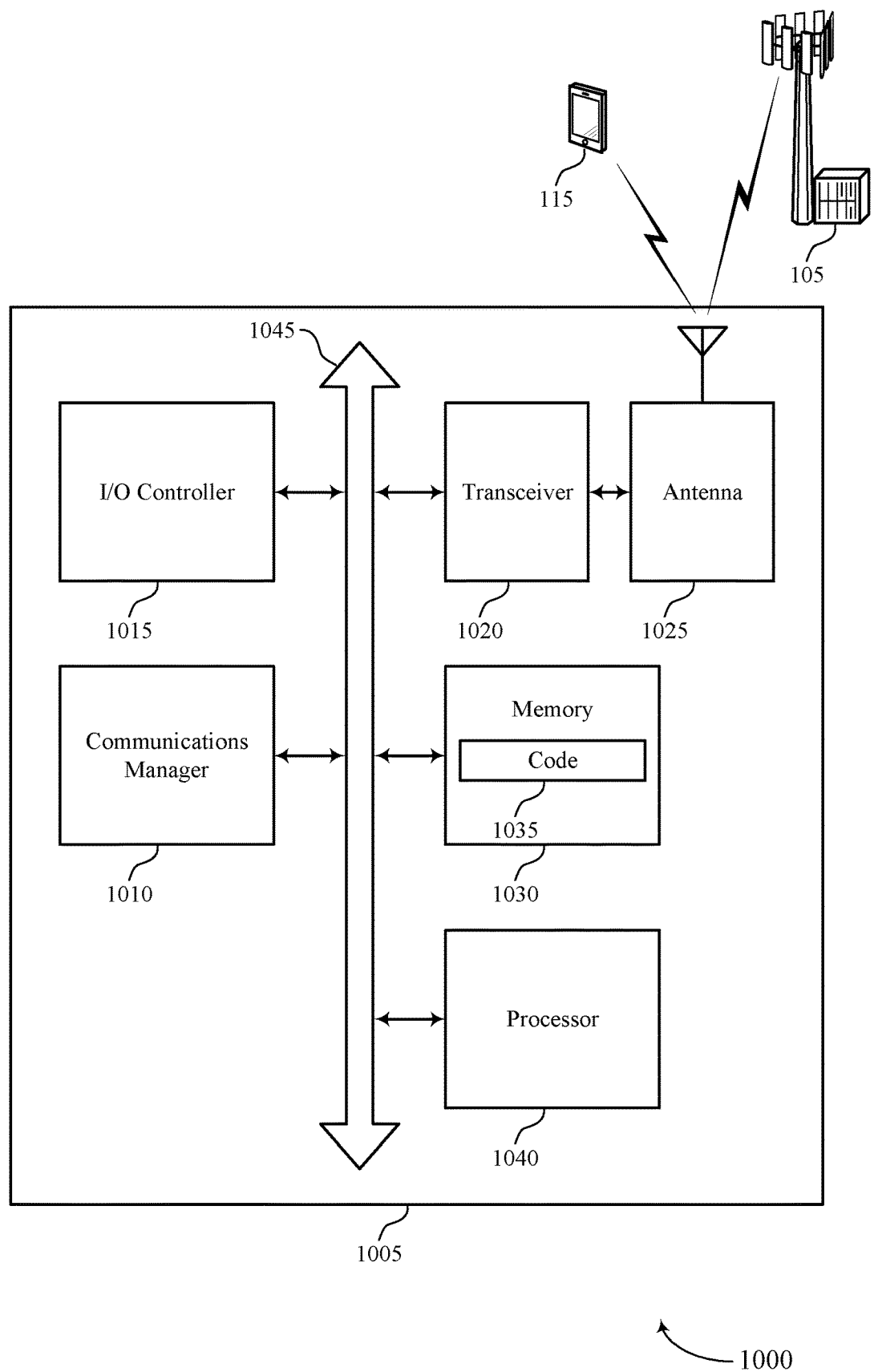
FIG. 10 shows a diagram of a system including a device that supports dwell time based channel contention in wireless communications in accordance with aspects of the present disclosure.

FIG. 10 shows a diagram of a system 1000 including a device 1005 that supports dwell time based channel contention in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a first wireless device that has obtained channel access to a wireless channel in a shared radio frequency spectrum, schedule information that indicates a first portion of a COT duration is to be used for a communication of the second wireless device via the wireless channel, transmit the communication responsive to the performing the LBT procedure, and perform a LBT procedure for at least a minimum dwell time based on the schedule information to determine that the wireless channel is unused by one or more other transmitters.

The communications manager 1015 may as described herein be implemented to realize one or more potential advantages. One implementation may allow the device 1005 to enhance efficiency of communications using shared radio frequency spectrum through coordination of LBT procedures for one or more transmitting devices within a COT duration, which may allow for enhanced system throughput and reduced latency for certain communications. Further, implementations may allow the device 1005 to have additional flexibility for scheduling communications within a COT duration to provide efficient resource utilization, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dwell time based channel contention in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
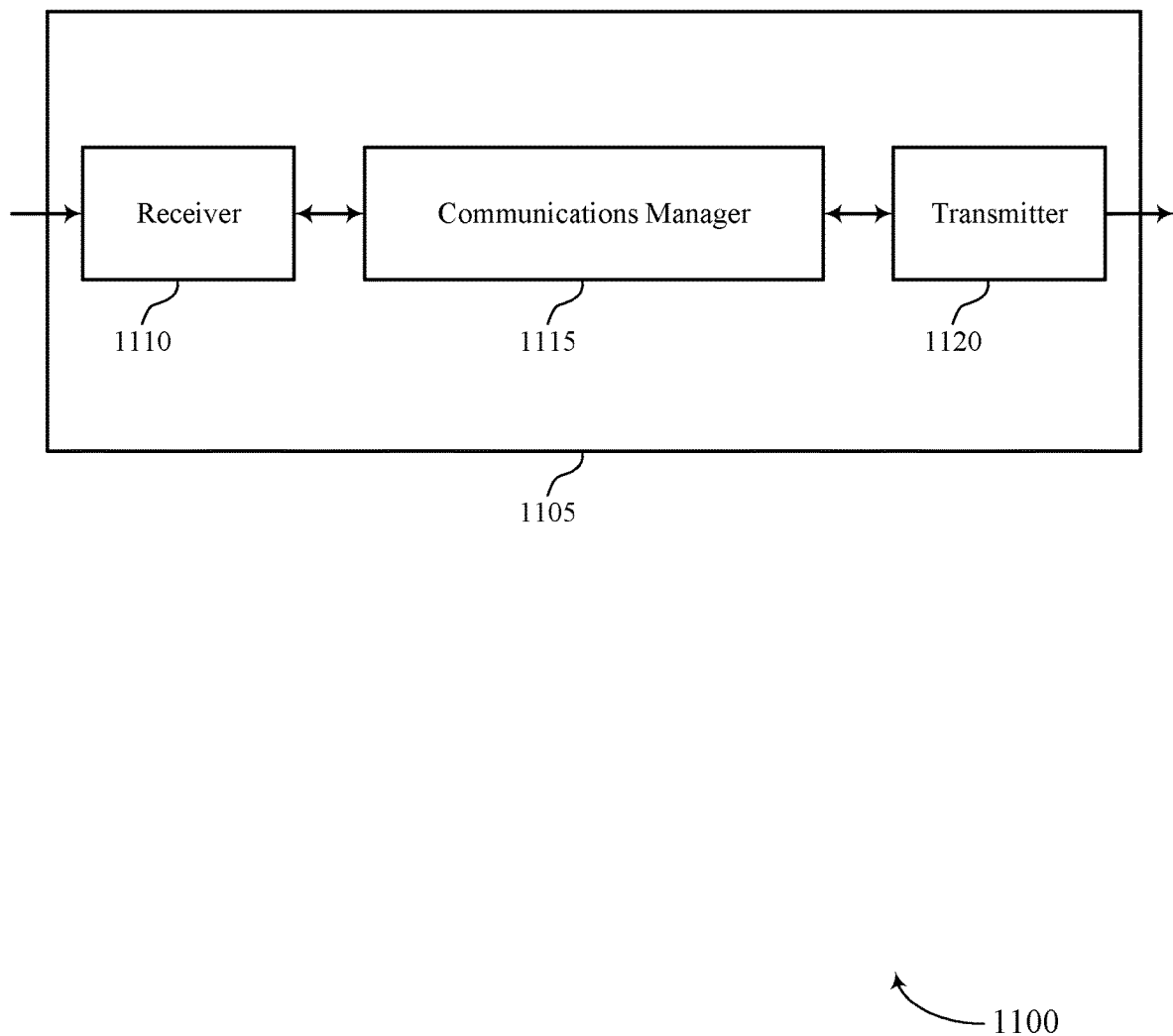
FIGS. 11 and 12 show block diagrams of devices that support dwell time based channel contention in wireless communications in accordance with aspects of the present disclosure.

FIG. 11 shows a block diagram 1100 of a device 1105 that supports dwell time based channel contention in wireless communications in accordance with aspects of the present disclosure. The device 1105 may be an example of aspects of a UE 115 or base station 105 as described herein. The device 1105 may include a receiver 1110, a communications manager 1115, and a transmitter 1120. The device 1105 may also include a processor. Each of these components may be in communication with one another (e.g., via one or more buses).

Receiver 1110 may receive information such as packets, user data, or control information associated with various information channels (e.g., control channels, data channels, and information related to dwell time based channel contention in wireless communications, etc.). Information may be passed on to other components of the device 1105. The receiver 1110 may be an example of aspects of the transceiver 1420 or 1520 as described with reference to FIGS. 14 and 15. The receiver 1110 may utilize a single antenna or a set of antennas.

The communications manager 1115 may gain channel access to a wireless channel in a shared radio frequency spectrum based on a first LBT procedure that indicates the wireless channel is unused by one or more other transmitters, where the first LBT procedure provides the channel access for a maximum COT duration, transmit, responsive to gaining the channel access, a first communication to one or more receiving devices via the wireless channel during the maximum COT duration, transmit, subsequent to the transmission gap and in an absence of a second LBT procedure, a second communication to the one or more receiving devices during the maximum COT duration, and discontinue transmitting via the wireless channel subsequent to the first communication for at least a duration of a transmission gap. The communications manager 1115 may be an example of aspects of the communications manager 1410 or 1510 as described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 or 1520 as described with reference to FIGS. 14 and 15. The transmitter 1120 may utilize a single antenna or a set of antennas.

Figure 12:
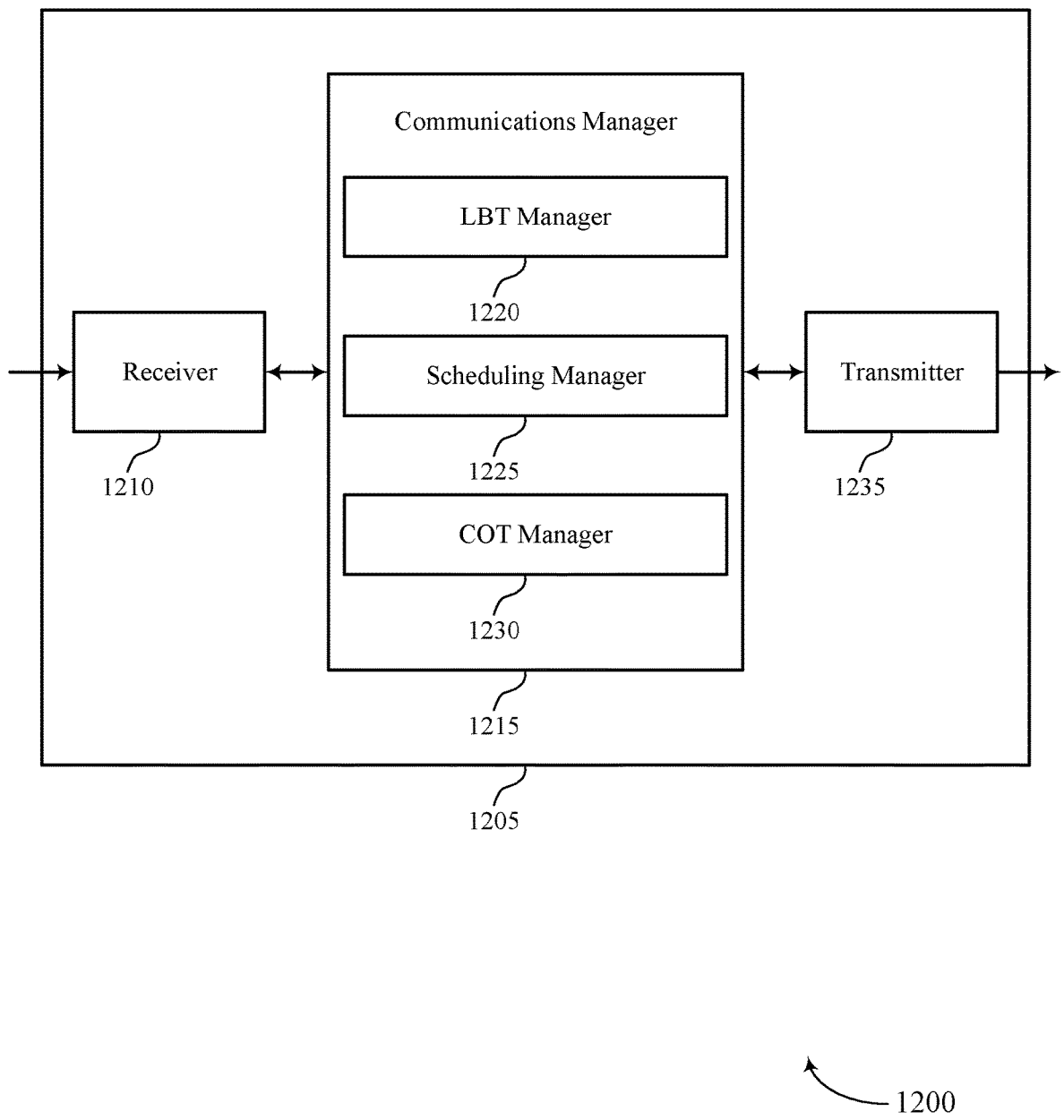

FIG. 12 shows a block diagram 1200 of a device 1205 that supports dwell time based channel contention in wireless communications in accordance with aspects of the present disclosure. The device 1205 may be an example of aspects of a device 1105, a UE 115, or a base station 105 as described herein. The device 1205 may include a receiver 1210, a communications manager 1215, and a transmitter 1235. The device 1205 may also include a processor. Each of these components may be in communication with one another (e.g., via one or more buses).

Receiver 1210 may receive information such as packets, user data, or control information associated with various information channels (e.g., control channels, data channels, and information related to dwell time based channel contention in wireless communications, etc.). Information may be passed on to other components of the device 1205. The receiver 1210 may be an example of aspects of the transceiver 1420 or 1520 as described with reference to FIGS. 14 and 15. The receiver 1210 may utilize a single antenna or a set of antennas.

The communications manager 1215 may be an example of aspects of the communications manager 1115 as described herein. The communications manager 1215 may include a LBT manager 1220, a scheduling manager 1225, and a COT manager 1230. The communications manager 1215 may be an example of aspects of the communications manager 1410 or 1510 as described herein.

The LBT manager 1220 may gain channel access to a wireless channel in a shared radio frequency spectrum based on a first LBT procedure that indicates the wireless channel is unused by one or more other transmitters, where the first LBT procedure provides the channel access for a maximum COT duration.

The scheduling manager 1225 may transmit, responsive to gaining the channel access, a first communication to one or more receiving devices via the wireless channel during the maximum COT duration and transmit, subsequent to the transmission gap and in an absence of a second LBT procedure, a second communication to the one or more receiving devices during the maximum COT duration.

The COT manager 1230 may discontinue transmitting via the wireless channel subsequent to the first communication for at least a duration of a transmission gap.

The LBT manager 1220, or its sub-components, may be implemented in hardware, code (e.g., software or firmware) executed by a processor, or any combination thereof. If implemented in code executed by a processor, the functions of the LBT manager 1220, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 1220, or its sub-components, may be physically located at various positions, including being distributed such that portions of functions are implemented at different physical locations by one or more physical components. In some examples, the LBT manager 1220, or its sub-components, may be a separate and distinct component in accordance with various aspects of the present disclosure. In some examples, the LBT manager 1220, or its sub-components, may be combined with one or more other hardware components, including but not limited to an I/O component, a transceiver, a network server, another computing device, one or more other components described in the present disclosure, or a combination thereof in accordance with various aspects of the present disclosure.

The scheduling manager 1225, or its sub-components, may be implemented in hardware, code (e.g., software or firmware) executed by a processor, or any combination thereof. If implemented in code executed by a processor, the functions of the scheduling manager 1225, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 1225, or its sub-components, may be physically located at various positions, including being distributed such that portions of functions are implemented at different physical locations by one or more physical components. In some examples, the scheduling manager 1225, or its sub-components, may be a separate and distinct component in accordance with various aspects of the present disclosure. In some examples, the scheduling manager 1225, or its sub-components, may be combined with one or more other hardware components, including but not limited to an I/O component, a transceiver, a network server, another computing device, one or more other components described in the present disclosure, or a combination thereof in accordance with various aspects of the present disclosure.

The COT manager 1230, or its sub-components, may be implemented in hardware, code (e.g., software or firmware) executed by a processor, or any combination thereof. If implemented in code executed by a processor, the functions of the COT manager 1230, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The COT manager 1230, or its sub-components, may be physically located at various positions, including being distributed such that portions of functions are implemented at different physical locations by one or more physical components. In some examples, the COT manager 1230, or its sub-components, may be a separate and distinct component in accordance with various aspects of the present disclosure. In some examples, the COT manager 1230, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 or 1520 as described with reference to FIGS. 14 and 15. The transmitter 1235 may utilize a single antenna or a set of antennas.

Figure 13:
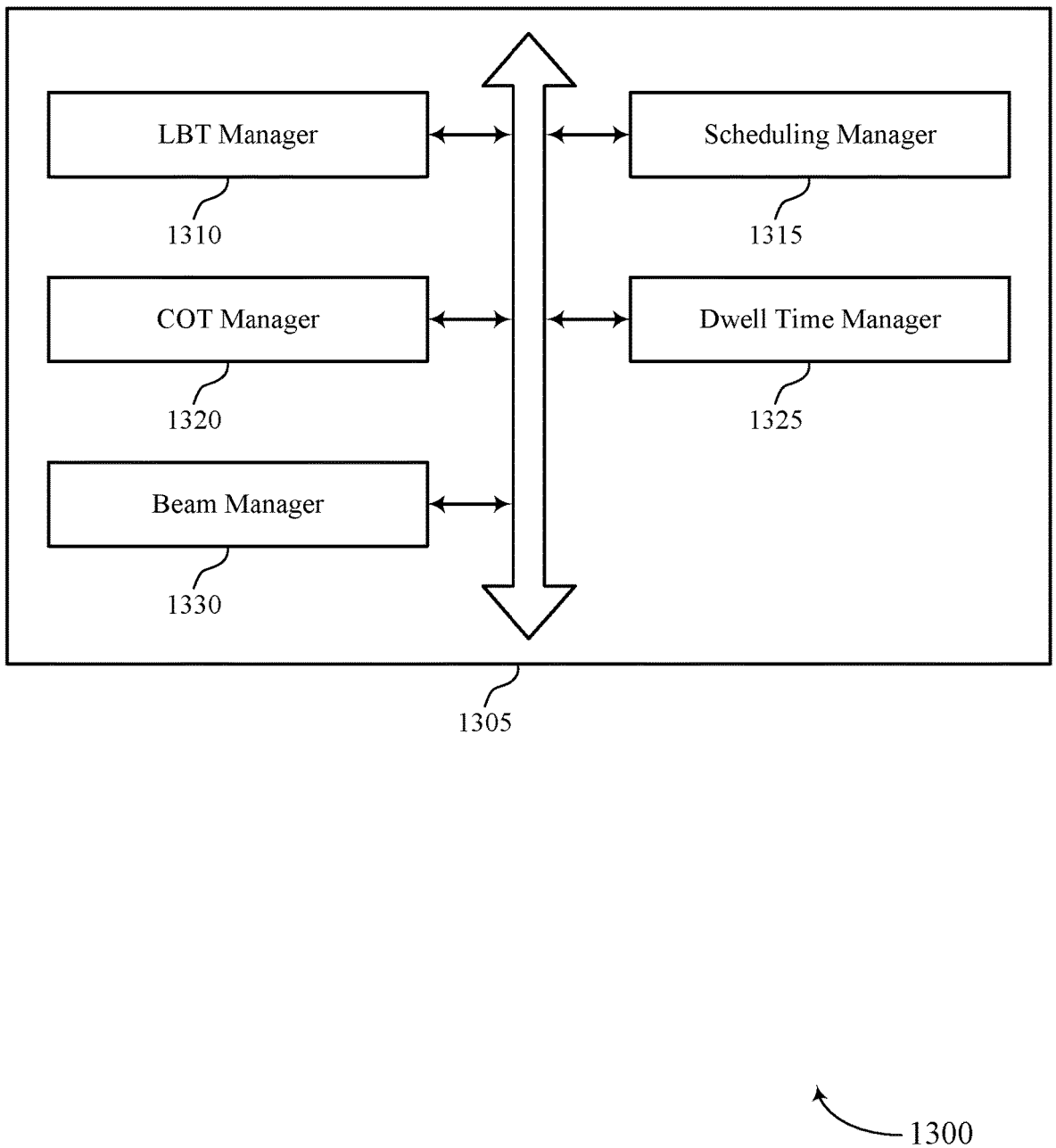
FIG. 13 shows a block diagram of a communications manager that supports dwell time based channel contention in wireless communications in accordance with aspects of the present disclosure.

FIG. 13 shows a block diagram 1300 of a communications manager 1305 that supports dwell time based channel contention in wireless communications in accordance with aspects of the present disclosure. The communications manager 1305 may be an example of aspects of a communications manager 1115, a communications manager 1215, or a communications manager 1410 described herein. The communications manager 1305 may include a LBT manager 1310, a scheduling manager 1315, a COT manager 1320, a dwell time manager 1325, and a beam manager 1330. Each of these modules may communicate, directly or indirectly, with one another (e.g., via one or more buses).

The LBT manager 1310 may gain channel access to a wireless channel in a shared radio frequency spectrum based on a first LBT procedure that indicates the wireless channel is unused by one or more other transmitters, where the first LBT procedure provides the channel access for a maximum COT duration. In some examples, the LBT manager 1310 may perform the second LBT procedure that indicates the wireless channel is unused by one or more other transmitters.

The scheduling manager 1315 may transmit, responsive to gaining the channel access, a first communication to one or more receiving devices via the wireless channel during the maximum COT duration. In some examples, the scheduling manager 1315 may transmit, subsequent to a transmission gap and in an absence of a second LBT procedure, a second communication to the one or more receiving devices during the maximum COT duration. In some examples, the scheduling manager 1315 may discontinue transmitting via the wireless channel subsequent to the second communication for at least a duration of the second transmission gap. In some examples, the scheduling manager 1315 may transmit a third communication to the one or more receiving devices.

The COT manager 1320 may discontinue transmitting via the wireless channel subsequent to the first communication for at least a duration of a transmission gap. In some examples, the COT manager 1320 may determine that the transmission gap is less than a threshold transmission gap duration, and where the second communication is transmitted in the absence of the second LBT procedure responsive to the transmission gap being less than the threshold transmission gap duration. In some examples, the COT manager 1320 may determine that the second transmission gap meets or exceeds the threshold transmission gap duration. In some cases, the second communication is transmitted starting at any time during the maximum COT duration without performing the second LBT procedure.

The dwell time manager 1325 may manage LBT procedure channel sensing durations in accordance with configured dwell times. In some cases, the second LBT procedure monitors for the one or more other transmitters for at least a minimum dwell time. In some cases, the minimum dwell time corresponds to a time period for periodic reservation signal transmissions of devices that use the wireless channel. In some cases, the first LBT procedure monitors for the one or more other transmitters for at least the minimum dwell time.

The beam manager 1330 may configure one or more beam parameters for one or more sensing or transmit beams. In some cases, the first LBT procedure monitors for the one or more other transmitters on a first sensing beam, and where the first communication and the second communication are transmitted using one or more transmit beams that are selected based on the first sensing beam. In some cases, the one or more transmit beams include a subset of available transmit beams that are associated with the first sensing beam. In some cases, the one or more transmit beams include any available transmit beams with a transmit power adjustment that is a function of antenna gain of the first sensing beam. In some cases, the one or more transmit beams include any available transmit beams with a transmit power adjustment that is a function of an energy detection threshold of the first sensing beam.

The LBT manager 1310, or its sub-components, may be implemented in hardware, code (e.g., software or firmware) executed by a processor, or any combination thereof. If implemented in code executed by a processor, the functions of the LBT manager 1310, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 1310, or its sub-components, may be physically located at various positions, including being distributed such that portions of functions are implemented at different physical locations by one or more physical components. In some examples, the LBT manager 1310, or its sub-components, may be a separate and distinct component in accordance with various aspects of the present disclosure. In some examples, the LBT manager 1310, or its sub-components, may be combined with one or more other hardware components, including but not limited to an I/O component, a transceiver, a network server, another computing device, one or more other components described in the present disclosure, or a combination thereof in accordance with various aspects of the present disclosure.

The scheduling manager 1315, or its sub-components, may be implemented in hardware, code (e.g., software or firmware) executed by a processor, or any combination thereof. If implemented in code executed by a processor, the functions of the scheduling manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 1315, or its sub-components, may be physically located at various positions, including being distributed such that portions of functions are implemented at different physical locations by one or more physical components. In some examples, the scheduling manager 1315, or its sub-components, may be a separate and distinct component in accordance with various aspects of the present disclosure. In some examples, the scheduling manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The COT manager 1320, or its sub-components, may be implemented in hardware, code (e.g., software or firmware) executed by a processor, or any combination thereof. If implemented in code executed by a processor, the functions of the COT manager 1320, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The COT manager 1320, or its sub-components, may be physically located at various positions, including being distributed such that portions of functions are implemented at different physical locations by one or more physical components. In some examples, the COT manager 1320, or its sub-components, may be a separate and distinct component in accordance with various aspects of the present disclosure. In some examples, the COT manager 1320, or its sub-components, may be combined with one or more other hardware components, including but not limited to an I/O component, a transceiver, a network server, another computing device, one or more other components described in the present disclosure, or a combination thereof in accordance with various aspects of the present disclosure.

The dwell time manager 1325, or its sub-components, may be implemented in hardware, code (e.g., software or firmware) executed by a processor, or any combination thereof. If implemented in code executed by a processor, the functions of the dwell time manager 1325, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The dwell time manager 1325, or its sub-components, may be physically located at various positions, including being distributed such that portions of functions are implemented at different physical locations by one or more physical components. In some examples, the dwell time manager 1325, or its sub-components, may be a separate and distinct component in accordance with various aspects of the present disclosure. In some examples, the dwell time manager 1325, or its sub-components, may be combined with one or more other hardware components, including but not limited to an I/O component, a transceiver, a network server, another computing device, one or more other components described in the present disclosure, or a combination thereof in accordance with various aspects of the present disclosure.

The beam manager 1330, or its sub-components, may be implemented in hardware, code (e.g., software or firmware) executed by a processor, or any combination thereof. If implemented in code executed by a processor, the functions of the beam manager 1330, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The beam manager 1330, or its sub-components, may be physically located at various positions, including being distributed such that portions of functions are implemented at different physical locations by one or more physical components. In some examples, the beam manager 1330, or its sub-components, may be a separate and distinct component in accordance with various aspects of the present disclosure. In some examples, the beam manager 1330, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 14:
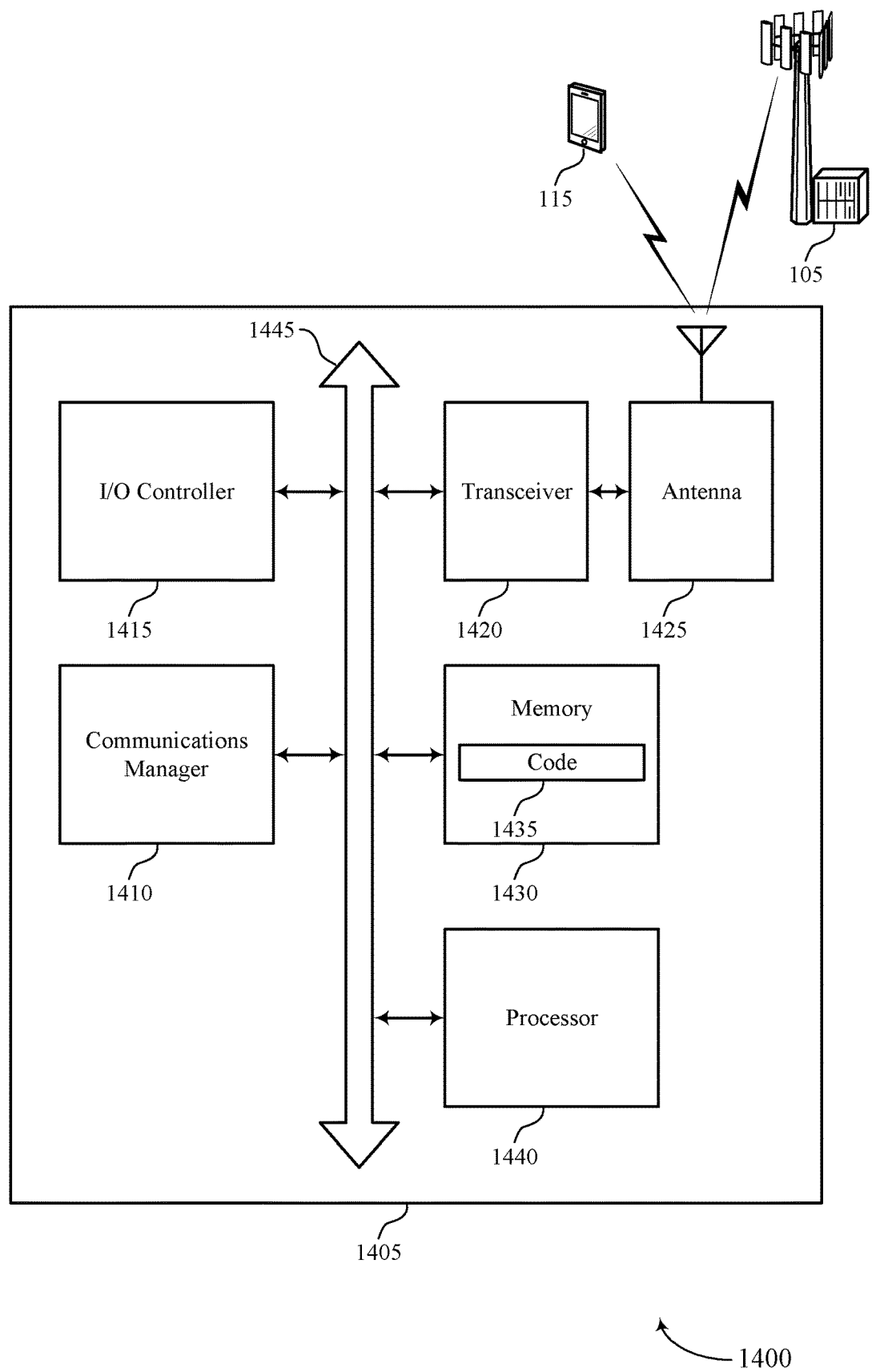
FIG. 14 shows a diagram of a system including a user equipment (UE) that supports dwell time based channel contention in wireless communications in accordance with aspects of the present disclosure.

FIG. 14 shows a diagram of a system 1400 including a device 1405 that supports dwell time based channel contention in wireless communications in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, a transceiver 1420, an antenna 1425, memory 1430, a processor 1440, and an I/O controller 1415. These components may be in electronic communication via one or more buses (e.g., bus 1445).

The communications manager 1410 may gain channel access to a wireless channel in a shared radio frequency spectrum based on a first LBT procedure that indicates the wireless channel is unused by one or more other transmitters, where the first LBT procedure provides the channel access for a maximum COT duration, transmit, responsive to gaining the channel access, a first communication to one or more receiving devices via the wireless channel during the maximum COT duration, transmit, subsequent to the transmission gap and in an absence of a second LBT procedure, a second communication to the one or more receiving devices during the maximum COT duration, and discontinue transmitting via the wireless channel subsequent to the first communication for at least a duration of a transmission gap.

The communications manager 1410 may as described herein be implemented to realize one or more potential advantages. One implementation may allow the device 1405 to enhance efficiency of communications using shared radio frequency spectrum within the COT duration in the absence of a LBT procedure, which may allow for enhanced system throughput and reduced latency for certain communications. Further, implementations may allow the device 1405 to have additional flexibility for scheduling communications within a COT duration to provide efficient resource utilization, among other advantages.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting dwell time based channel contention in wireless communications).

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
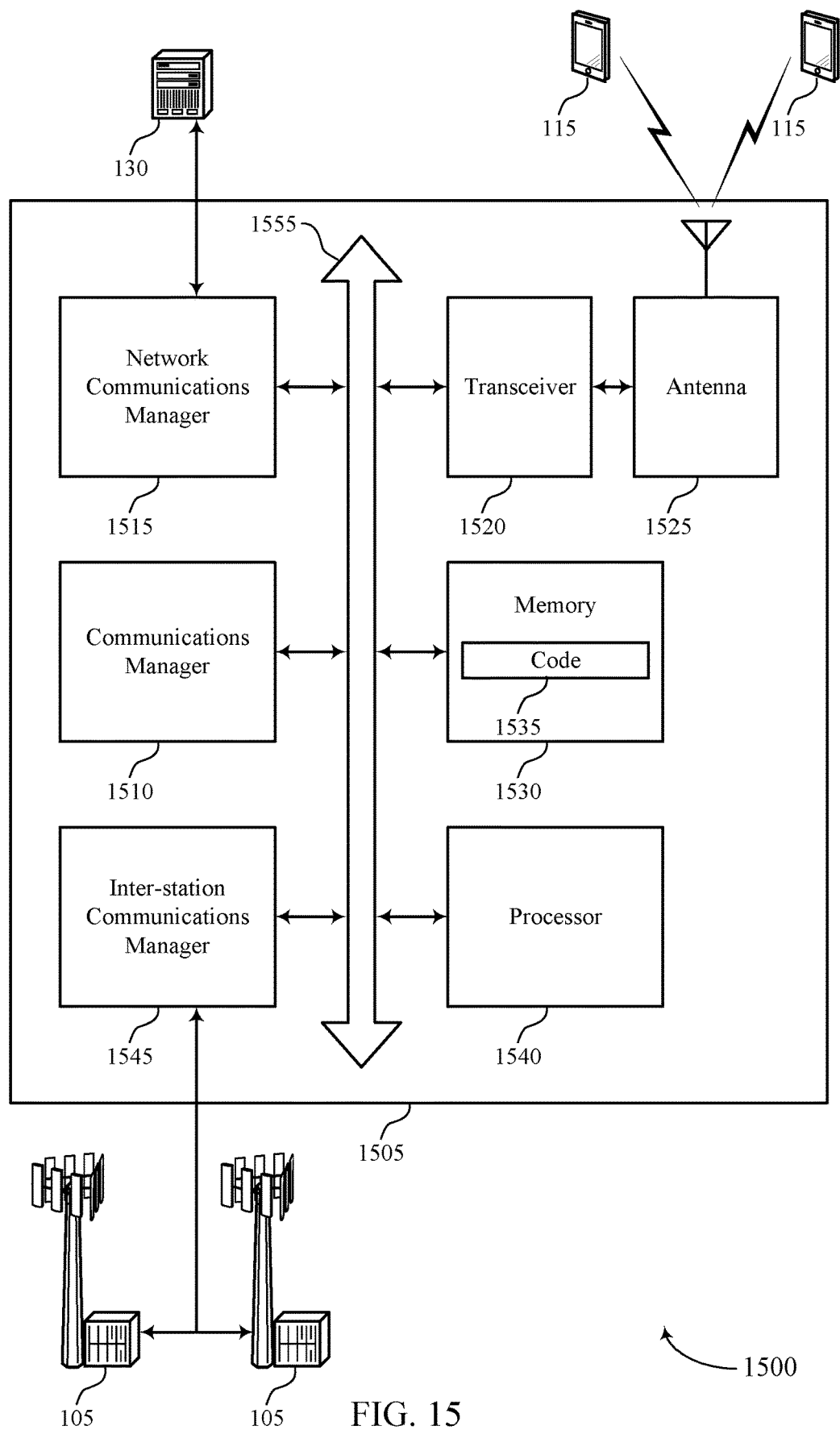
FIG. 15 shows a diagram of a system including a base station that supports dwell time based channel contention in wireless communications in accordance with aspects of the present disclosure.

FIG. 15 shows a diagram of a system 1500 including a device 1505 that supports dwell time based channel contention in wireless communications in accordance with aspects of the present disclosure. The device 1505 may be an example of or include the components of device 1105, device 1205, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1555. These components may be in electronic communication via one or more buses (e.g., bus 1545).

The communications manager 1510 may gain channel access to a wireless channel in a shared radio frequency spectrum based on a first LBT procedure that indicates the wireless channel is unused by one or more other transmitters, where the first LBT procedure provides the channel access for a maximum COT duration, transmit, responsive to gaining the channel access, a first communication to one or more receiving devices via the wireless channel during the maximum COT duration, transmit, subsequent to the transmission gap and in an absence of a second LBT procedure, a second communication to the one or more receiving devices during the maximum COT duration, and discontinue transmitting via the wireless channel subsequent to the first communication for at least a duration of a transmission gap.

The communications manager 1510 may as described herein be implemented to realize one or more potential advantages. One implementation may allow the device 1505 to enhance efficiency of communications using shared radio frequency spectrum within the COT duration in the absence of a LBT procedure, which may allow for enhanced system throughput and reduced latency for certain communications. Further, implementations may allow the device 1505 to have additional flexibility for scheduling communications within a COT duration to provide efficient resource utilization, among other advantages.

Network communications manager 1550 may manage communications with the core network (e.g., via one or more wired backhaul links). For example, the network communications manager 1550 may manage the transfer of data communications for client devices, such as one or more UEs 115.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting dwell time based channel contention in wireless communications).

Inter-station communications manager 1555 may manage communications with other base station 105, and may include a controller or scheduler for controlling communications with UEs 115 in cooperation with other base stations 105. For example, the inter-station communications manager 1555 may coordinate scheduling for transmissions to UEs 115 for various interference mitigation techniques such as beamforming or joint transmission. In some examples, inter-station communications manager 1555 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
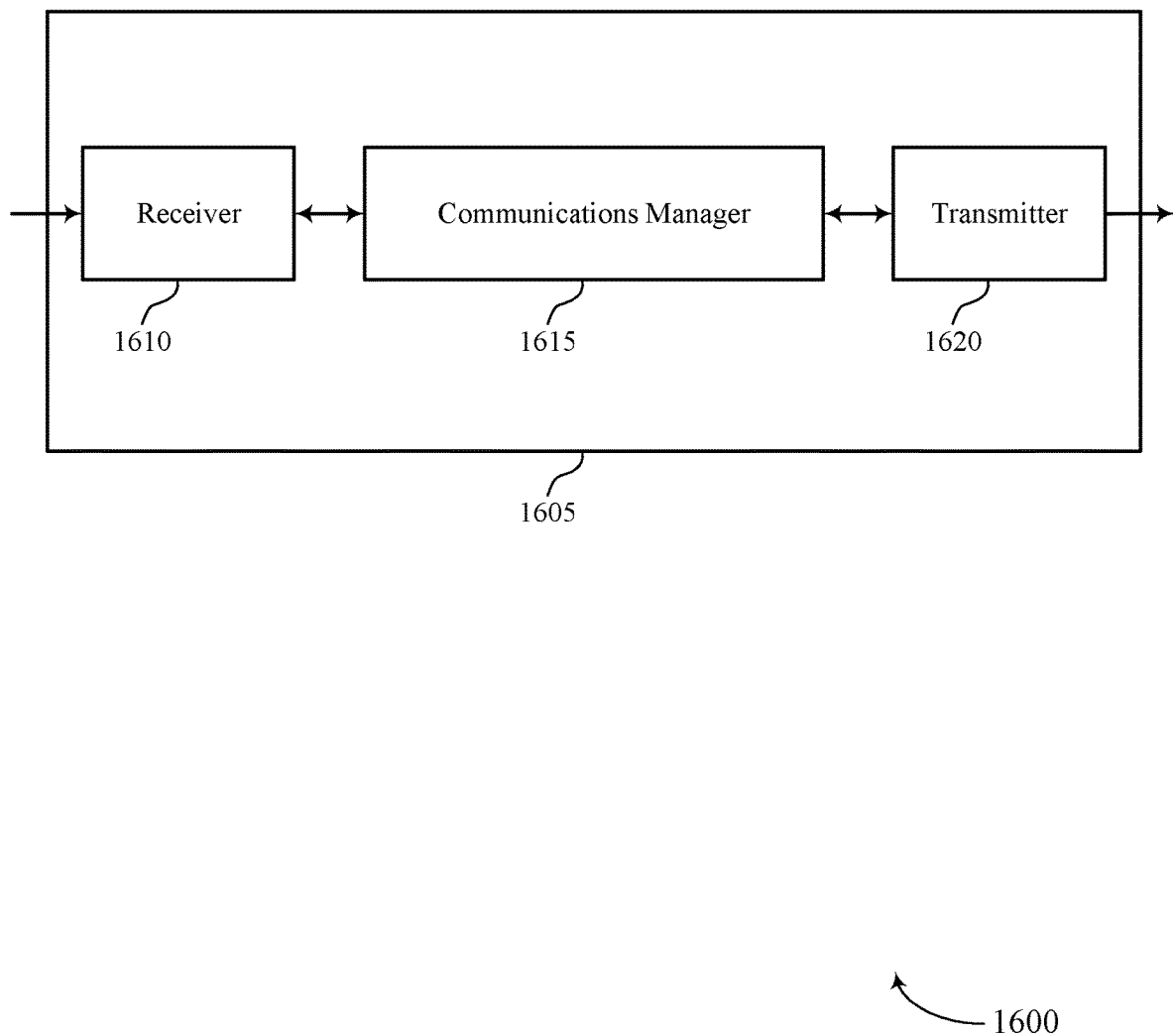
FIGS. 16 and 17 show block diagrams of devices that support dwell time based channel contention in wireless communications in accordance with aspects of the present disclosure.

FIG. 16 shows a block diagram 1600 of a device 1605 that supports dwell time based channel contention in wireless communications in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to dwell time based channel contention in wireless communications, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may gain channel access to a wireless channel in a shared radio frequency spectrum based on a first LBT procedure that indicates the wireless channel is unused by one or more other transmitters, where the first LBT procedure provides the channel access for a COT duration, schedule at least a second wireless device to transmit during a first portion of the COT duration based on a second LBT procedure that is associated with the COT duration, and receive one or more transmissions from the second wireless device during the COT duration. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
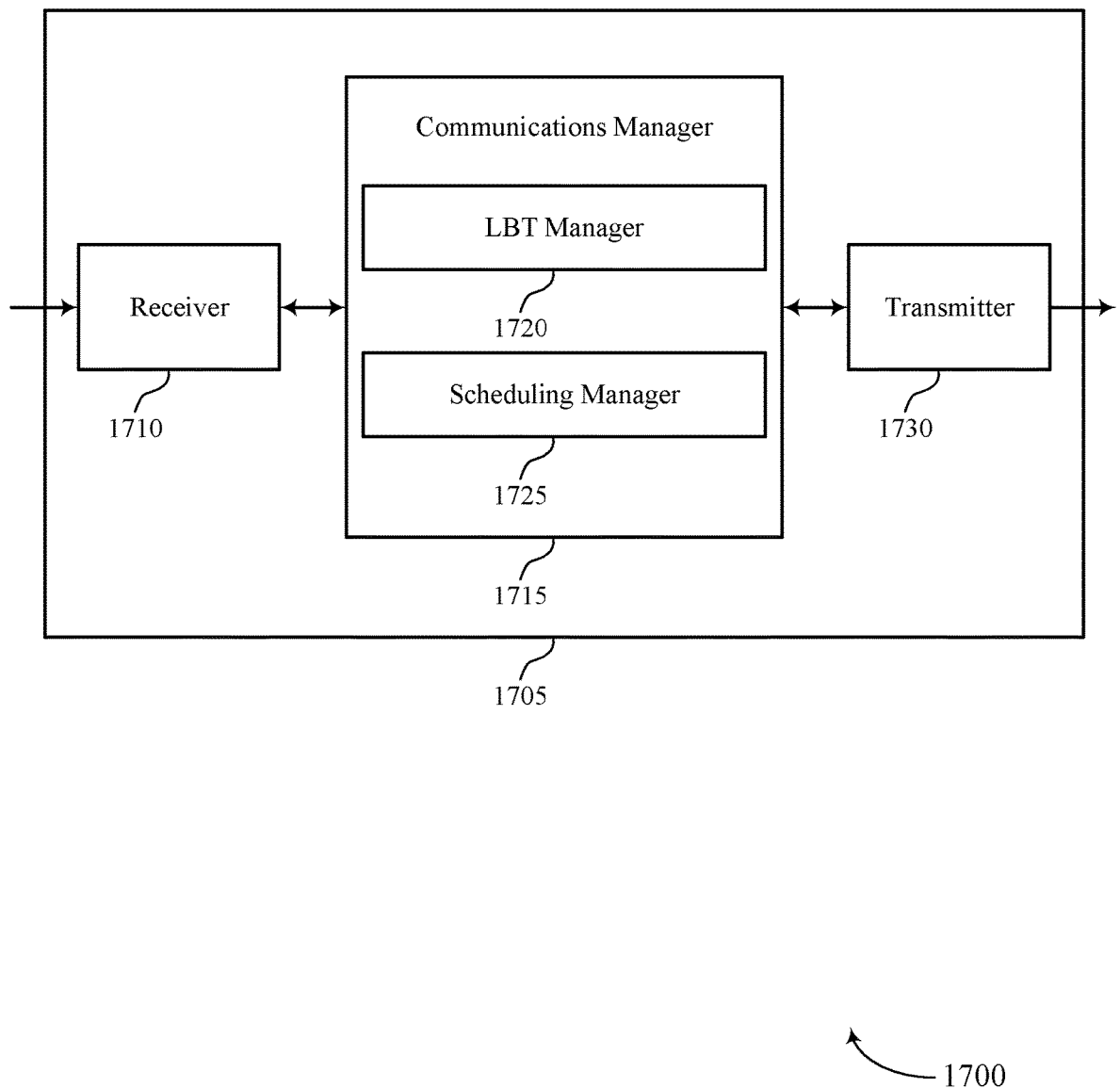

FIG. 17 shows a block diagram 1700 of a device 1705 that supports dwell time based channel contention in wireless communications in accordance with aspects of the present disclosure. The device 1705 may be an example of aspects of a device 1605, or a base station 105 as described herein. The device 1705 may include a receiver 1710, a communications manager 1715, and a transmitter 1730. The device 1705 may also include a processor. Each of these components may be in communication with one another (e.g., via one or more buses).

The receiver 1710 may receive information such as packets, user data, or control information associated with various information channels (e.g., control channels, data channels, and information related to dwell time based channel contention in wireless communications, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a LBT manager 1720 and a scheduling manager 1725. The communications manager 1715 may be an example of aspects of the communications manager 1910 described herein.

The LBT manager 1720 may gain channel access to a wireless channel in a shared radio frequency spectrum based on a first LBT procedure that indicates the wireless channel is unused by one or more other transmitters, where the first LBT procedure provides the channel access for a COT duration.

The scheduling manager 1725 may schedule at least a second wireless device to transmit during a first portion of the COT duration based on a second LBT procedure that is associated with the COT duration and receive one or more transmissions from the second wireless device during the COT duration.

The LBT manager 1720, or its sub-components, may be implemented in hardware, code (e.g., software or firmware) executed by a processor, or any combination thereof. If implemented in code executed by a processor, the functions of the LBT manager 1720, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 1720, or its sub-components, may be physically located at various positions, including being distributed such that portions of functions are implemented at different physical locations by one or more physical components. In some examples, the LBT manager 1720, or its sub-components, may be a separate and distinct component in accordance with various aspects of the present disclosure. In some examples, the LBT manager 1720, or its sub-components, may be combined with one or more other hardware components, including but not limited to an I/O component, a transceiver, a network server, another computing device, one or more other components described in the present disclosure, or a combination thereof in accordance with various aspects of the present disclosure.

The scheduling manager 1725, or its sub-components, may be implemented in hardware, code (e.g., software or firmware) executed by a processor, or any combination thereof. If implemented in code executed by a processor, the functions of the scheduling manager 1725, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 1725, or its sub-components, may be physically located at various positions, including being distributed such that portions of functions are implemented at different physical locations by one or more physical components. In some examples, the scheduling manager 1725, or its sub-components, may be a separate and distinct component in accordance with various aspects of the present disclosure. In some examples, the scheduling manager 1725, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1730 may transmit signals generated by other components of the device 1705. In some examples, the transmitter 1730 may be collocated with a receiver 1710 in a transceiver module. For example, the transmitter 1730 may be an example of aspects of the transceiver 1920 described with reference to FIG. 19. The transmitter 1730 may utilize a single antenna or a set of antennas.

Figure 18:
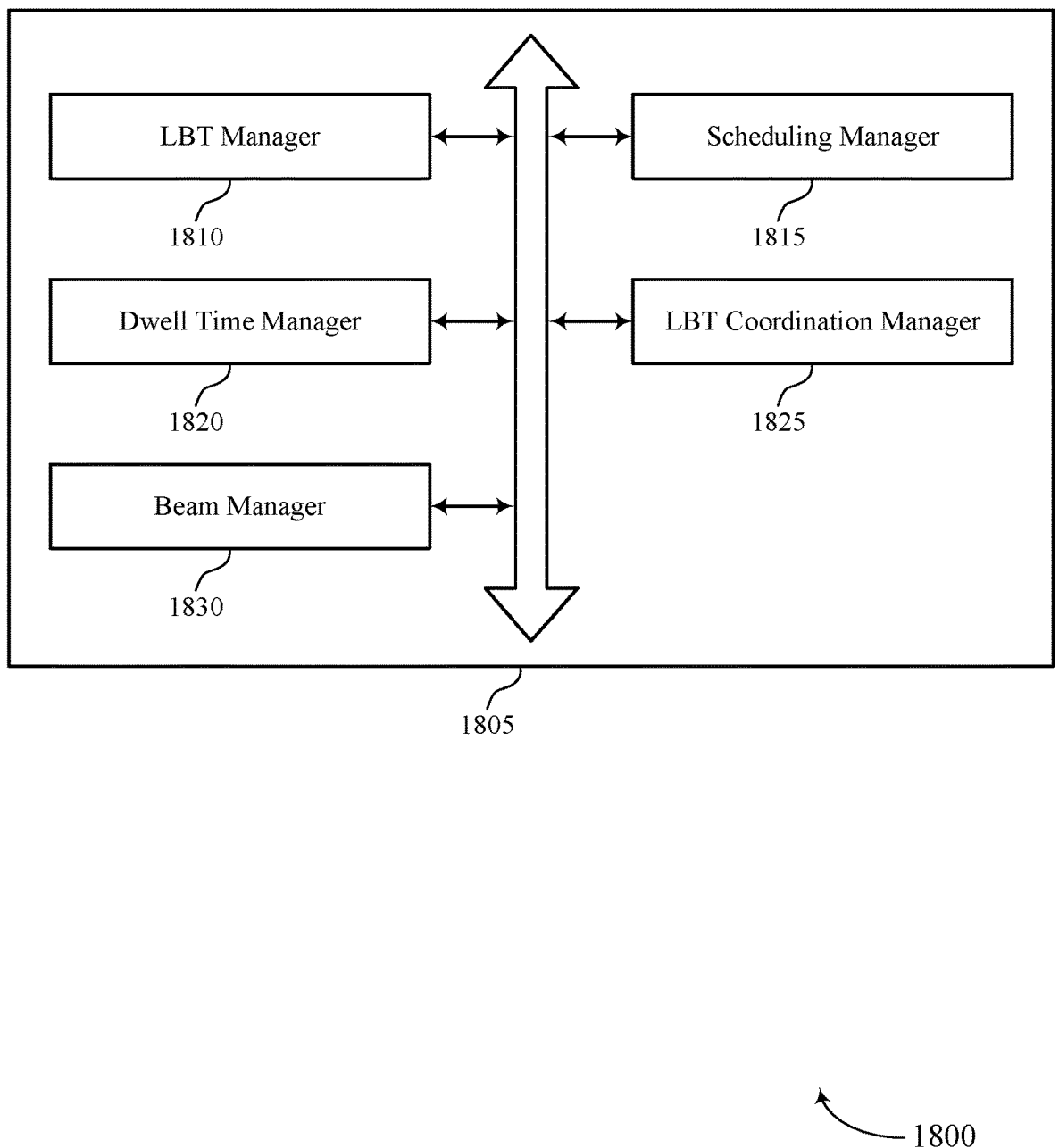
FIG. 18 shows a block diagram of a communications manager that supports dwell time based channel contention in wireless communications in accordance with aspects of the present disclosure.

FIG. 18 shows a block diagram 1800 of a communications manager 1805 that supports dwell time based channel contention in wireless communications in accordance with aspects of the present disclosure. The communications manager 1805 may be an example of aspects of a communications manager 1615, a communications manager 1715, or a communications manager 1910 described herein. The communications manager 1805 may include a LBT manager 1810, a scheduling manager 1815, a dwell time manager 1820, a LBT coordination manager 1825, and a beam manager 1830. Each of these modules may communicate, directly or indirectly, with one another (e.g., via one or more buses).

The LBT manager 1810 may gain channel access to a wireless channel in a shared radio frequency spectrum based on a first LBT procedure that indicates the wireless channel is unused by one or more other transmitters, where the first LBT procedure provides the channel access for a COT duration. In some cases, the second LBT procedure is performed at any time prior to the first portion of the COT duration.

The scheduling manager 1815 may schedule at least a second wireless device to transmit during a first portion of the COT duration based on a second LBT procedure that is associated with the COT duration. In some examples, the scheduling manager 1815 may receive one or more transmissions from the second wireless device during the COT duration.

The dwell time manager 1820 may configure a dwell time associated with LBT procedures. In some cases, the second LBT procedure is performed for at least a minimum dwell time in advance of the first portion of the COT duration. In some cases, the second LBT procedure monitors for the one or more other transmitters for at least a minimum dwell time. In some cases, the minimum dwell time corresponds to a time period for periodic reservation signal transmissions of devices that use the wireless channel.

The LBT coordination manager 1825 may schedule the second wireless device to perform the second LBT procedure during a LBT period prior to the first portion of the COT duration. In some cases, the LBT period is a time window prior to the first portion of the COT duration.

The beam manager 1830 may configure one or more beamforming parameters for one or more transmit or receive beams. In some cases, the first LBT procedure monitors for the one or more other transmitters on a first sensing beam, and where the first wireless device transmits during the COT duration using one or more transmit beams that are selected based on the first sensing beam. In some cases, the one or more transmit beams include a subset of available transmit beams that are associated with the first sensing beam. In some cases, the one or more transmit beams include any available transmit beams with a transmit power adjustment that is a function of antenna gain of the first sensing beam. In some cases, the one or more transmit beams include any available transmit beams with a transmit power adjustment that is a function of an energy detection threshold of the first sensing beam.

The LBT manager 1810, or its sub-components, may be implemented in hardware, code (e.g., software or firmware) executed by a processor, or any combination thereof. If implemented in code executed by a processor, the functions of the LBT manager 1810, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT manager 1810, or its sub-components, may be physically located at various positions, including being distributed such that portions of functions are implemented at different physical locations by one or more physical components. In some examples, the LBT manager 1810, or its sub-components, may be a separate and distinct component in accordance with various aspects of the present disclosure. In some examples, the LBT manager 1810, or its sub-components, may be combined with one or more other hardware components, including but not limited to an I/O component, a transceiver, a network server, another computing device, one or more other components described in the present disclosure, or a combination thereof in accordance with various aspects of the present disclosure.

The scheduling manager 1815, or its sub-components, may be implemented in hardware, code (e.g., software or firmware) executed by a processor, or any combination thereof. If implemented in code executed by a processor, the functions of the scheduling manager 1815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The scheduling manager 1815, or its sub-components, may be physically located at various positions, including being distributed such that portions of functions are implemented at different physical locations by one or more physical components. In some examples, the scheduling manager 1815, or its sub-components, may be a separate and distinct component in accordance with various aspects of the present disclosure. In some examples, the scheduling manager 1815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The dwell time manager 1820, or its sub-components, may be implemented in hardware, code (e.g., software or firmware) executed by a processor, or any combination thereof. If implemented in code executed by a processor, the functions of the dwell time manager 1820, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The dwell time manager 1820, or its sub-components, may be physically located at various positions, including being distributed such that portions of functions are implemented at different physical locations by one or more physical components. In some examples, the dwell time manager 1820, or its sub-components, may be a separate and distinct component in accordance with various aspects of the present disclosure. In some examples, the dwell time manager 1820, or its sub-components, may be combined with one or more other hardware components, including but not limited to an I/O component, a transceiver, a network server, another computing device, one or more other components described in the present disclosure, or a combination thereof in accordance with various aspects of the present disclosure.

The LBT coordination manager 1825, or its sub-components, may be implemented in hardware, code (e.g., software or firmware) executed by a processor, or any combination thereof. If implemented in code executed by a processor, the functions of the LBT coordination manager 1825, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The LBT coordination manager 1825, or its sub-components, may be physically located at various positions, including being distributed such that portions of functions are implemented at different physical locations by one or more physical components. In some examples, the LBT coordination manager 1825, or its sub-components, may be a separate and distinct component in accordance with various aspects of the present disclosure. In some examples, the LBT coordination manager 1825, or its sub-components, may be combined with one or more other hardware components, including but not limited to an I/O component, a transceiver, a network server, another computing device, one or more other components described in the present disclosure, or a combination thereof in accordance with various aspects of the present disclosure.

The beam manager 1830, or its sub-components, may be implemented in hardware, code (e.g., software or firmware) executed by a processor, or any combination thereof. If implemented in code executed by a processor, the functions of the beam manager 1830, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The beam manager 1830, or its sub-components, may be physically located at various positions, including being distributed such that portions of functions are implemented at different physical locations by one or more physical components. In some examples, the beam manager 1830, or its sub-components, may be a separate and distinct component in accordance with various aspects of the present disclosure. In some examples, the beam manager 1830, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 19:
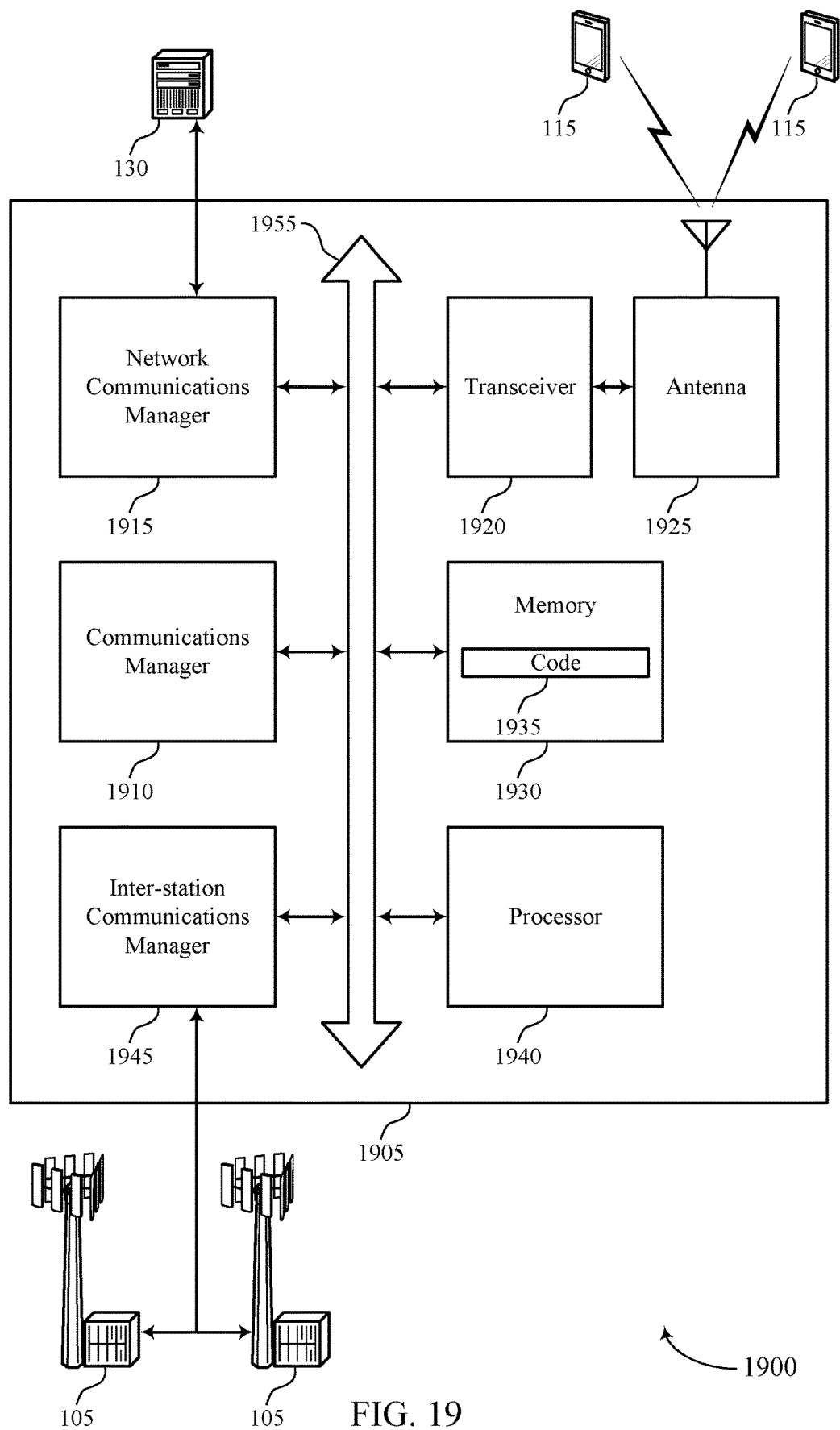
FIG. 19 shows a diagram of a system including a device that supports dwell time based channel contention in wireless communications in accordance with aspects of the present disclosure.

FIG. 19 shows a diagram of a system 1900 including a device 1905 that supports dwell time based channel contention in wireless communications in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1955).

The communications manager 1910 may gain channel access to a wireless channel in a shared radio frequency spectrum based on a first LBT procedure that indicates the wireless channel is unused by one or more other transmitters, where the first LBT procedure provides the channel access for a COT duration, schedule at least a second wireless device to transmit during a first portion of the COT duration based on a second LBT procedure that is associated with the COT duration, and receive one or more transmissions from the second wireless device during the COT duration.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting dwell time based channel contention in wireless communications).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
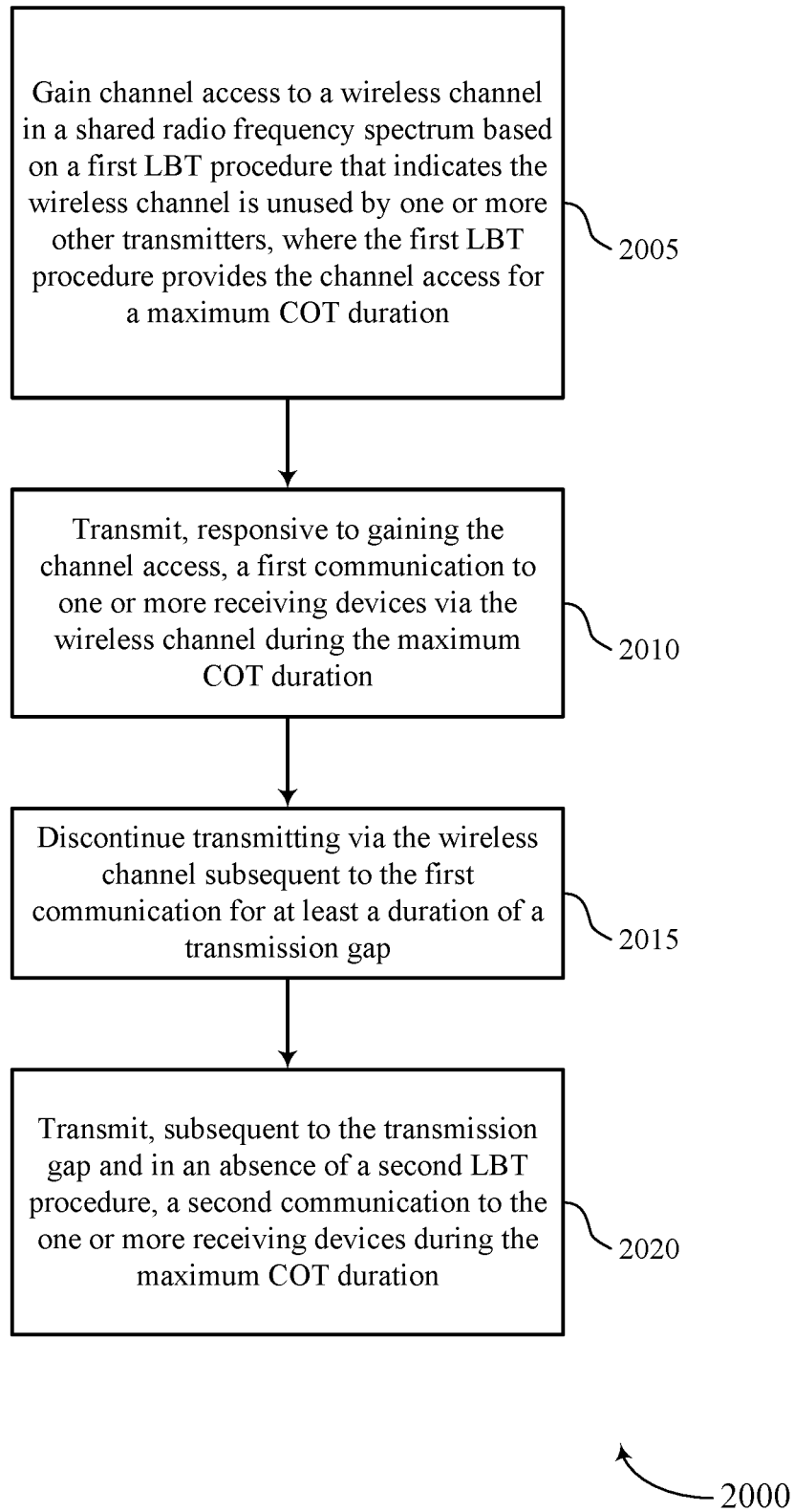
FIGS. 20 through 24 show flowcharts illustrating methods that support dwell time based channel contention in wireless communications in accordance with aspects of the present disclosure.

FIG. 20 shows a flowchart illustrating a method 2000 that supports dwell time based channel contention in wireless communications in accordance with aspects of the present disclosure. The operations of method 2000 may be implemented by a UE 115 or base station 105 or its components as described herein. For example, the operations of method 2000 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may gain channel access to a wireless channel in a shared radio frequency spectrum based on a first LBT procedure that indicates the wireless channel is unused by one or more other transmitters, where the first LBT procedure provides the channel access for a maximum COT duration. The operations of 2005 may be performed according to the methods described herein. In some examples, aspects of the operations of 2005 may be performed by a LBT manager as described with reference to FIGS. 11 through 15.

At 2010, the UE or base station may transmit, responsive to gaining the channel access, a first communication to one or more receiving devices via the wireless channel during the maximum COT duration. The operations of 2010 may be performed according to the methods described herein. In some examples, aspects of the operations of 2010 may be performed by a scheduling manager as described with reference to FIGS. 11 through 15.

At 2015, the UE or base station may discontinue transmitting via the wireless channel subsequent to the first communication for at least a duration of a transmission gap. The operations of 2015 may be performed according to the methods described herein. In some examples, aspects of the operations of 2015 may be performed by a COT manager as described with reference to FIGS. 11 through 15.

At 2020, the UE or base station may transmit, subsequent to the transmission gap and in an absence of a second LBT procedure, a second communication to the one or more receiving devices during the maximum COT duration. The operations of 2020 may be performed according to the methods described herein. In some examples, aspects of the operations of 2020 may be performed by a scheduling manager as described with reference to FIGS. 11 through 15.

Figure 21:
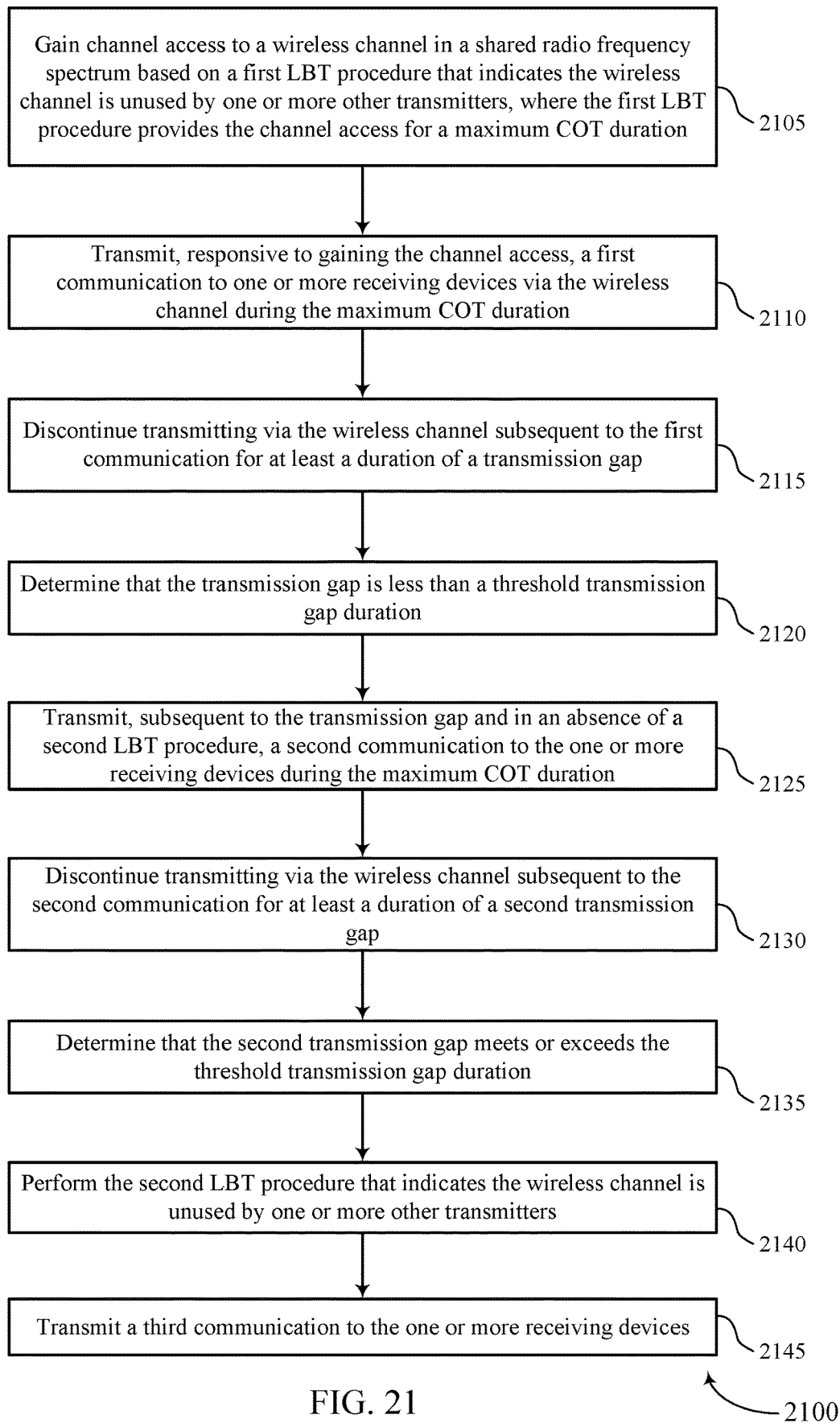

FIG. 21 shows a flowchart illustrating a method 2100 that supports dwell time based channel contention in wireless communications in accordance with aspects of the present disclosure. The operations of method 2100 may be implemented by a UE 115 or base station 105 or its components as described herein. For example, the operations of method 2100 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may gain channel access to a wireless channel in a shared radio frequency spectrum based on a first LBT procedure that indicates the wireless channel is unused by one or more other transmitters, where the first LBT procedure provides the channel access for a maximum COT duration. The operations of 2105 may be performed according to the methods described herein. In some examples, aspects of the operations of 2105 may be performed by a LBT manager as described with reference to FIGS. 11 through 15.

At 2110, the UE or base station may transmit, responsive to gaining the channel access, a first communication to one or more receiving devices via the wireless channel during the maximum COT duration. The operations of 2110 may be performed according to the methods described herein. In some examples, aspects of the operations of 2110 may be performed by a scheduling manager as described with reference to FIGS. 11 through 15.

At 2115, the UE or base station may discontinue transmitting via the wireless channel subsequent to the first communication for at least a duration of a transmission gap. The operations of 2115 may be performed according to the methods described herein. In some examples, aspects of the operations of 2115 may be performed by a COT manager as described with reference to FIGS. 11 through 15.

At 2120, the UE or base station may determine that the transmission gap is less than a threshold transmission gap duration, and where the second communication is transmitted in the absence of the second LBT procedure responsive to the transmission gap being less than the threshold transmission gap duration. The operations of 2120 may be performed according to the methods described herein. In some examples, aspects of the operations of 2120 may be performed by a COT manager as described with reference to FIGS. 11 through 15.

At 2125, the UE or base station may transmit, subsequent to the transmission gap and in an absence of a second LBT procedure, a second communication to the one or more receiving devices during the maximum COT duration. The operations of 2125 may be performed according to the methods described herein. In some examples, aspects of the operations of 2125 may be performed by a scheduling manager as described with reference to FIGS. 11 through 15.

At 2130, the UE or base station may discontinue transmitting via the wireless channel subsequent to the second communication for at least a duration of a second transmission gap. The operations of 2130 may be performed according to the methods described herein. In some examples, aspects of the operations of 2130 may be performed by a scheduling manager as described with reference to FIGS. 11 through 15.

At 2135, the UE or base station may determine that the second transmission gap meets or exceeds the threshold transmission gap duration. The operations of 2135 may be performed according to the methods described herein. In some examples, aspects of the operations of 2135 may be performed by a COT manager as described with reference to FIGS. 11 through 15.

At 2140, the UE or base station may perform the second LBT procedure that indicates the wireless channel is unused by one or more other transmitters. The operations of 2140 may be performed according to the methods described herein. In some examples, aspects of the operations of 2140 may be performed by a LBT manager as described with reference to FIGS. 11 through 15.

At 2145, the UE or base station may transmit a third communication to the one or more receiving devices. The operations of 2145 may be performed according to the methods described herein. In some examples, aspects of the operations of 2145 may be performed by a scheduling manager as described with reference to FIGS. 11 through 15.

Figure 22:
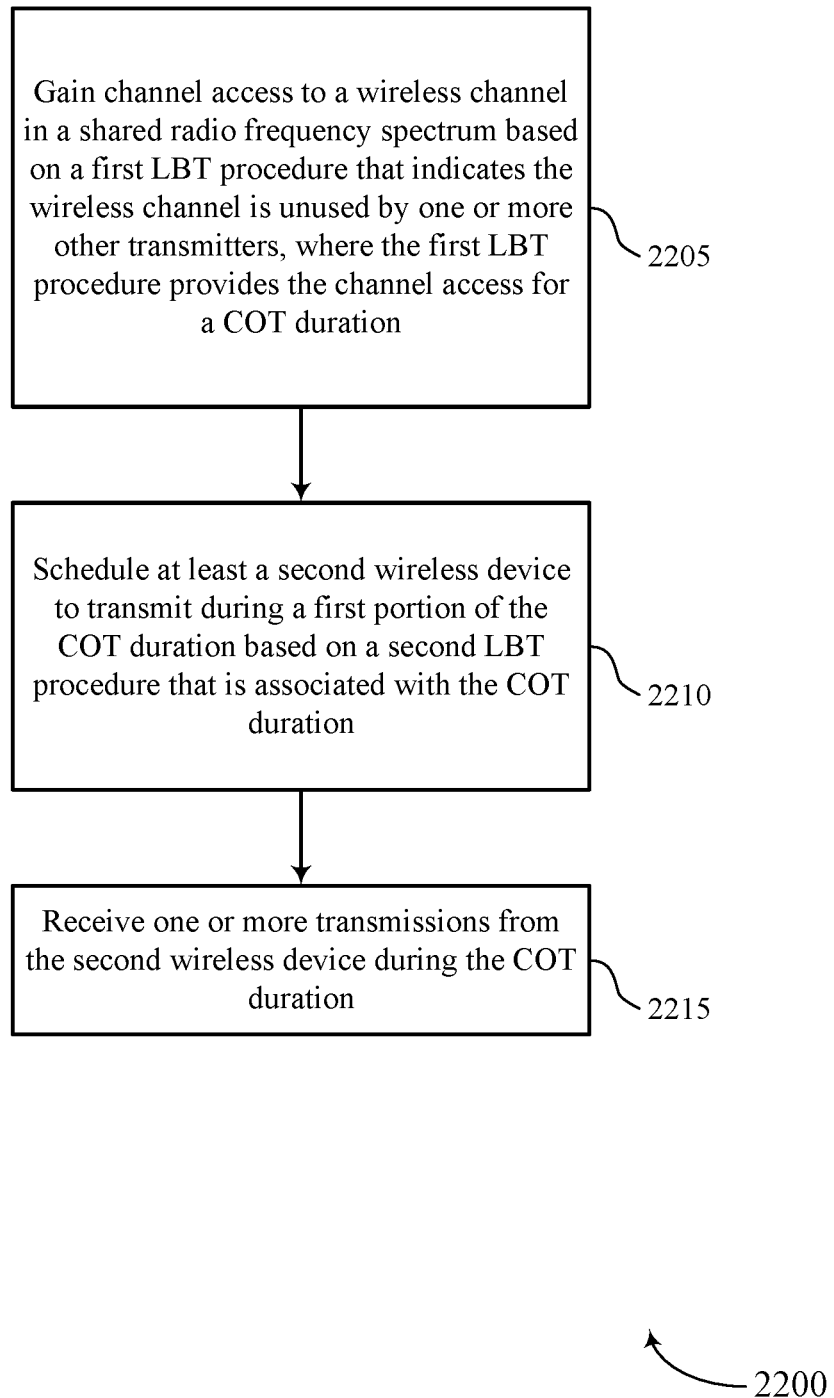

FIG. 22 shows a flowchart illustrating a method 2200 that supports dwell time based channel contention in wireless communications in accordance with aspects of the present disclosure. The operations of method 2200 may be implemented by a base station 105 or its components as described herein. For example, the operations of method 2200 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2205, the base station may gain channel access to a wireless channel in a shared radio frequency spectrum based on a first LBT procedure that indicates the wireless channel is unused by one or more other transmitters, where the first LBT procedure provides the channel access for a COT duration. The operations of 2205 may be performed according to the methods described herein. In some examples, aspects of the operations of 2205 may be performed by a LBT manager as described with reference to FIGS. 16 through 19.

At 2210, the base station may schedule at least a second wireless device to transmit during a first portion of the COT duration based on a second LBT procedure that is associated with the COT duration. The operations of 2210 may be performed according to the methods described herein. In some examples, aspects of the operations of 2210 may be performed by a scheduling manager as described with reference to FIGS. 16 through 19.

At 2215, the base station may receive one or more transmissions from the second wireless device during the COT duration. The operations of 2215 may be performed according to the methods described herein. In some examples, aspects of the operations of 2215 may be performed by a scheduling manager as described with reference to FIGS. 16 through 19.

Figure 23:
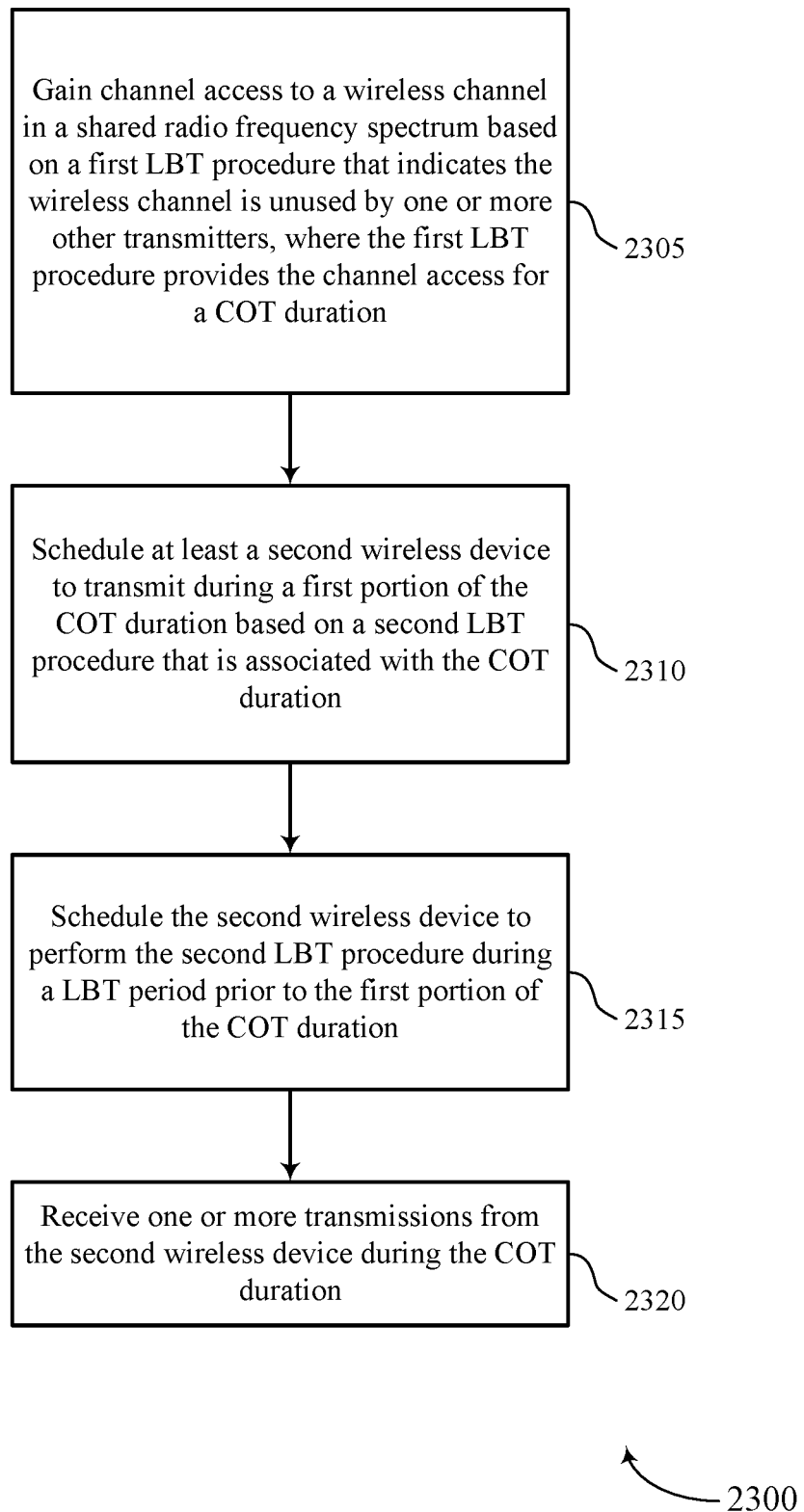

FIG. 23 shows a flowchart illustrating a method 2300 that supports dwell time based channel contention in wireless communications in accordance with aspects of the present disclosure. The operations of method 2300 may be implemented by a base station 105 or its components as described herein. For example, the operations of method 2300 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2305, the base station may gain channel access to a wireless channel in a shared radio frequency spectrum based on a first LBT procedure that indicates the wireless channel is unused by one or more other transmitters, where the first LBT procedure provides the channel access for a COT duration. The operations of 2305 may be performed according to the methods described herein. In some examples, aspects of the operations of 2305 may be performed by a LBT manager as described with reference to FIGS. 16 through 19.

At 2310, the base station may schedule at least a second wireless device to transmit during a first portion of the COT duration based on a second LBT procedure that is associated with the COT duration. The operations of 2310 may be performed according to the methods described herein. In some examples, aspects of the operations of 2310 may be performed by a scheduling manager as described with reference to FIGS. 16 through 19.

At 2315, the base station may schedule the second wireless device to perform the second LBT procedure during a LBT period prior to the first portion of the COT duration. The operations of 2315 may be performed according to the methods described herein. In some examples, aspects of the operations of 2315 may be performed by a LBT coordination manager as described with reference to FIGS. 16 through 19.

At 2320, the base station may receive one or more transmissions from the second wireless device during the COT duration. The operations of 2320 may be performed according to the methods described herein. In some examples, aspects of the operations of 2320 may be performed by a scheduling manager as described with reference to FIGS. 16 through 19.

Figure 24:
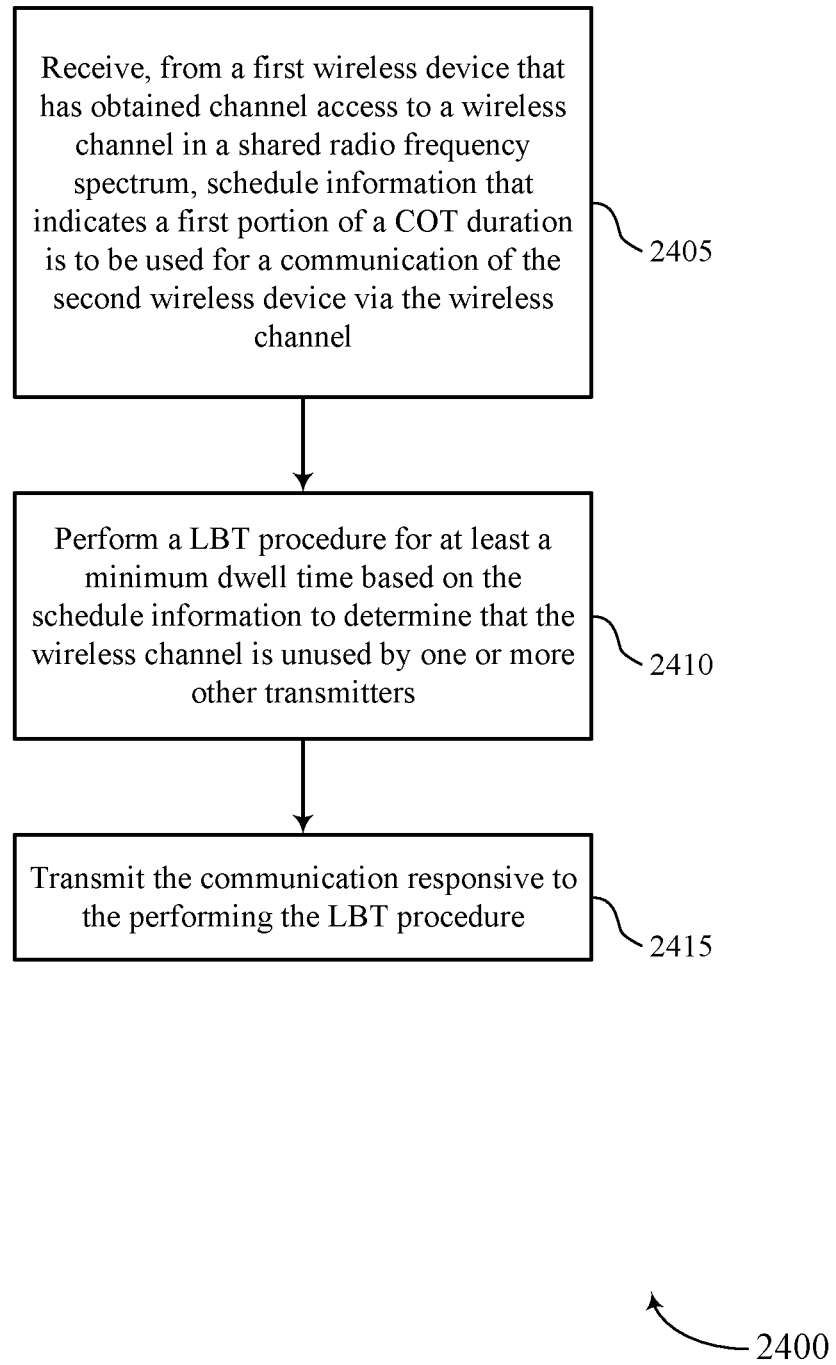

FIG. 24 shows a flowchart illustrating a method 2400 that supports dwell time based channel contention in wireless communications in accordance with aspects of the present disclosure. The operations of method 2400 may be implemented by a UE 115 or its components as described herein. For example, the operations of method 2400 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2405, the UE may receive, from a first wireless device that has obtained channel access to a wireless channel in a shared radio frequency spectrum, schedule information that indicates a first portion of a COT duration is to be used for a communication of the second wireless device via the wireless channel. The operations of 2405 may be performed according to the methods described herein. In some examples, aspects of the operations of 2405 may be performed by a scheduling manager as described with reference to FIGS. 7 through 10.

At 2410, the UE may perform a LBT procedure for at least a minimum dwell time based on the schedule information to determine that the wireless channel is unused by one or more other transmitters. The operations of 2410 may be performed according to the methods described herein. In some examples, aspects of the operations of 2410 may be performed by a LBT manager as described with reference to FIGS. 7 through 10.

At 2415, the UE may transmit the communication responsive to the performing the LBT procedure. The operations of 2415 may be performed according to the methods described herein. In some examples, aspects of the operations of 2415 may be performed by a scheduling manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications, comprising: gaining channel access to a wireless channel in a shared radio frequency spectrum based at least in part on a first LBT procedure that indicates the wireless channel is unused by one or more other transmitters, wherein the first LBT procedure provides the channel access for a maximum COT duration; transmitting, responsive to gaining the channel access, a first communication to one or more receiving devices via the wireless channel during the maximum COT duration; discontinuing transmitting via the wireless channel subsequent to the first communication for at least a duration of a transmission gap; and transmitting, subsequent to the transmission gap and in an absence of a second LBT procedure, a second communication to the one or more receiving devices during the maximum COT duration.

Aspect 2: The method of aspect 1, wherein the second communication is transmitted starting at any time during the maximum COT duration without performing the second LBT procedure.

Aspect 3: The method of any of aspects 1 through 2, further comprising: determining that the transmission gap is less than a threshold transmission gap duration, and wherein the second communication is transmitted in the absence of the second LBT procedure responsive to the transmission gap being less than the threshold transmission gap duration.

Aspect 4: The method of aspect 3, wherein the transmission gap is a first transmission gap, and wherein the method further comprises: discontinuing transmitting via the wireless channel subsequent to the second communication for at least a duration of a second transmission gap; determining that the second transmission gap meets or exceeds the threshold transmission gap duration; performing the second LBT procedure that indicates the wireless channel is unused by one or more other transmitters; and transmitting a third communication to the one or more receiving devices.

Aspect 5: The method of aspect 4, wherein the second LBT procedure monitors for the one or more other transmitters for at least a minimum dwell time.

Aspect 6: The method of aspect 5, wherein the minimum dwell time corresponds to a time period for periodic reservation signal transmissions of devices that use the wireless channel.

Aspect 7: The method of aspect 6, wherein the first LBT procedure monitors for the one or more other transmitters for at least the minimum dwell time.

Aspect 8: The method of any of aspects 1 through 7, wherein the first LBT procedure monitors for the one or more other transmitters on a first sensing beam, and the first communication and the second communication are transmitted using one or more transmit beams that are selected based at least in part on the first sensing beam.

Aspect 9: The method of aspect 8, wherein the one or more transmit beams comprise a subset of available transmit beams that are associated with the first sensing beam.

Aspect 10: The method of any of aspects 8 through 9, wherein the one or more transmit beams comprise any available transmit beams with a transmit power adjustment that is a function of antenna gain of the first sensing beam.

Aspect 11: The method of any of aspects 8 through 10, wherein the one or more transmit beams comprise any available transmit beams with a transmit power adjustment that is a function of an energy detection threshold of the first sensing beam.

Aspect 12: A method for wireless communications at a first wireless device, comprising: gaining channel access to a wireless channel in a shared radio frequency spectrum based at least in part on a first LBT procedure that indicates the wireless channel is unused by one or more other transmitters, wherein the first LBT procedure provides the channel access for a COT duration; scheduling at least a second wireless device to transmit during a first portion of the COT duration based on a second LBT procedure that is associated with the COT duration; and receiving one or more transmissions from the second wireless device during the COT duration.

Aspect 13: The method of aspect 12, wherein the second LBT procedure is performed for at least a minimum dwell time in advance of the first portion of the COT duration.

Aspect 14: The method of aspect 12, wherein the second LBT procedure is performed at any time prior to the first portion of the COT duration.

Aspect 15: The method of any of aspects 12 through 14, wherein the scheduling further comprises: scheduling the second wireless device to perform the second LBT procedure during a LBT period prior to the first portion of the COT duration.

Aspect 16: The method of aspect 15, wherein the LBT period is a time window prior to the first portion of the COT duration.

Aspect 17: The method of aspect 16, wherein the second LBT procedure monitors for the one or more other transmitters for at least a minimum dwell time.

Aspect 18: The method of aspect 17, wherein the minimum dwell time corresponds to a time period for periodic reservation signal transmissions of devices that use the wireless channel.

Aspect 19: The method of any of aspects 12 through 18, wherein the first LBT procedure monitors for the one or more other transmitters on a first sensing beam, and the first wireless device transmits during the COT duration using one or more transmit beams that are selected based at least in part on the first sensing beam.

Aspect 20: The method of aspect 19, wherein the one or more transmit beams comprise a subset of available transmit beams that are associated with the first sensing beam.

Aspect 21: The method of any of aspects 19 through 20, wherein the one or more transmit beams comprise any available transmit beams with a transmit power adjustment that is a function of antenna gain of the first sensing beam.

Aspect 22: The method of any of aspects 19 through 21, wherein the one or more transmit beams comprise any available transmit beams with a transmit power adjustment that is a function of an energy detection threshold of the first sensing beam.

Aspect 23: A method for wireless communications at a second wireless device, comprising: receiving, from a first wireless device that has obtained channel access to a wireless channel in a shared radio frequency spectrum, schedule information that indicates a first portion of a COT duration is to be used for a communication of the second wireless device via the wireless channel; performing a LBT procedure for at least a minimum dwell time based at least in part on the schedule information to determine that the wireless channel is unused by one or more other transmitters; and transmitting the communication responsive to the performing the LBT procedure.

Aspect 24: The method of aspect 23, wherein the LBT procedure is performed at any time after receiving the schedule information and prior to the first portion of the COT duration.

Aspect 25: The method of aspect 23, wherein the schedule information indicates that the second wireless device is to perform the LBT procedure during an identified LBT period prior to the first portion of the COT duration.

Aspect 26: The method of aspect 25, wherein the LBT period is a time window prior to the first portion of the COT duration, and the LBT procedure can be performed at any time during the time window.

Aspect 27: An apparatus for wireless communications, comprising a processor; memory coupled with the processor; and instructions stored in the memory and executable by the processor to cause the apparatus to perform a method of any of aspects 1 through 11.

Aspect 28: An apparatus for wireless communications, comprising at least one means for performing a method of any of aspects 1 through 11.

Aspect 29: A non-transitory computer-readable medium storing code for wireless communications, the code comprising instructions executable by a processor to perform a method of any of aspects 1 through 11.

Aspect 30: An apparatus for wireless communications at a first wireless device, comprising a processor; memory coupled with the processor; and instructions stored in the memory and executable by the processor to cause the apparatus to perform a method of any of aspects 12 through 22.

Aspect 31: An apparatus for wireless communications at a first wireless device, comprising at least one means for performing a method of any of aspects 12 through 22.

Aspect 32: A non-transitory computer-readable medium storing code for wireless communications at a first wireless device, the code comprising instructions executable by a processor to perform a method of any of aspects 12 through 22.

Aspect 33: An apparatus for wireless communications at a second wireless device, comprising a processor; memory coupled with the processor; and instructions stored in the memory and executable by the processor to cause the apparatus to perform a method of any of aspects 23 through 26.

Aspect 34: An apparatus for wireless communications at a second wireless device, comprising at least one means for performing a method of any of aspects 23 through 26.

Aspect 35: A non-transitory computer-readable medium storing code for wireless communications at a second wireless device, the code comprising instructions executable by a processor to perform a method of any of aspects 23 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   a processor,
   memory coupled with the processor; and
   instructions stored in the memory and executable by the processor to cause the apparatus to:
   gain channel access to a wireless channel in a shared radio frequency spectrum based at least in part on a first listen before talk procedure that indicates the wireless channel is unused by one or more other transmitters, wherein the first listen before talk procedure provides the channel access for a maximum channel occupancy time duration;
   transmit, responsive to gaining the channel access, a first communication to one or more receiving devices via the wireless channel during the maximum channel occupancy time duration;
   discontinue transmitting via the wireless channel subsequent to the first communication for at least a duration of a transmission gap;
   determine that the transmission gap is less than a threshold transmission gap duration; and
   transmit, subsequent to the transmission gap and in an absence of a second listen before talk procedure, a second communication to the one or more receiving devices during the maximum channel occupancy time duration;
   wherein the second communication is transmitted in the absence of the second listen before talk procedure responsive to the transmission gap being less than the threshold transmission gap duration.

2. The apparatus of claim 1, wherein the second communication is transmitted starting at any time during the maximum channel occupancy time duration without performing the second listen before talk procedure.

3. The apparatus of claim 1, wherein the transmission gap is a first transmission gap, and the instructions are further executable by the processor to cause the apparatus to:

discontinue transmitting via the wireless channel subsequent to the second communication for at least a duration of a second transmission gap;

determine that the second transmission gap meets or exceeds the threshold transmission gap duration;

perform the second listen before talk procedure that indicates the wireless channel is unused by the one or more other transmitters; and transmit a third communication to the one or more receiving devices.

4. The apparatus of claim 3, wherein the second listen before talk procedure monitors for the one or more other transmitters for at least a minimum dwell time.

5. The apparatus of claim 4, wherein the minimum dwell time corresponds to a time period for periodic reservation signal transmissions of devices that use the wireless channel.

6. The apparatus of claim 5, wherein the first listen before talk procedure monitors for the one or more other transmitters for at least the minimum dwell time.

7. The apparatus of claim 1, wherein the first listen before talk procedure monitors for the one or more other transmitters on a first sensing beam, and wherein the first communication and the second communication are transmitted using one or more transmit beams that are selected based at least in part on the first sensing beam.

8. The apparatus of claim 7, wherein the one or more transmit beams comprise a subset of available transmit beams that are associated with the first sensing beam.

9. The apparatus of claim 7, wherein the one or more transmit beams comprise any available transmit beams with a transmit power adjustment that is a function of antenna gain of the first sensing beam.

10. The apparatus of claim 7, wherein the one or more transmit beams comprise any available transmit beams with a transmit power adjustment that is a function of an energy detection threshold of the first sensing beam.

11. The apparatus of claim 1, further comprising an antenna, or a display, or a user interface, or a combination thereof.

12. A method for wireless communications, comprising:

gaining channel access to a wireless channel in a shared radio frequency spectrum based at least in part on a first listen before talk procedure that indicates the wireless channel is unused by one or more other transmitters, wherein the first listen before talk procedure provides the channel access for a maximum channel occupancy time duration;

transmitting, responsive to gaining the channel access, a first communication to one or more receiving devices via the wireless channel during the maximum channel occupancy time duration;

discontinuing transmitting via the wireless channel subsequent to the first communication for at least a duration of a transmission gap;

determining that the transmission gap is less than a threshold transmission gap duration; and transmitting, subsequent to the transmission gap and in an absence of a second listen before talk procedure, a second communication to the one or more receiving devices during the maximum channel occupancy time duration;

wherein the second communication is transmitted in the absence of the second listen before talk procedure responsive to the transmission gap being less than the threshold transmission gap duration.

13. The method of claim 12, wherein the second communication is transmitted starting at any time during the maximum channel occupancy time duration without performing the second listen before talk procedure.

14. The method of claim 12, wherein the transmission gap is a first transmission gap, and wherein the method further comprises:

discontinuing transmitting via the wireless channel subsequent to the second communication for at least a duration of a second transmission gap;

determining that the second transmission gap meets or exceeds the threshold transmission gap duration;

performing the second listen before talk procedure that indicates the wireless channel is unused by the one or more other transmitters; and transmitting a third communication to the one or more receiving devices.

15. The method of claim 14, wherein the second listen before talk procedure monitors for the one or more other transmitters for at least a minimum dwell time.

16. The method of claim 15, wherein the minimum dwell time corresponds to a time period for periodic reservation signal transmissions of devices that use the wireless channel.

17. The method of claim 16, wherein the first listen before talk procedure monitors for the one or more other transmitters for at least the minimum dwell time.

18. The method of claim 12, wherein the first listen before talk procedure monitors for the one or more other transmitters on a first sensing beam, and wherein the first communication and the second communication are transmitted using one or more transmit beams that are selected based at least in part on the first sensing beam.

19. The method of claim 18, wherein the one or more transmit beams comprise a subset of available transmit beams that are associated with the first sensing beam.

20. The method of claim 18, wherein the one or more transmit beams comprise any available transmit beams with a transmit power adjustment that is a function of antenna gain of the first sensing beam.

21. The method of claim 18, wherein the one or more transmit beams comprise any available transmit beams with a transmit power adjustment that is a function of an energy detection threshold of the first sensing beam.

22. An apparatus for wireless communications, comprising:

means for gaining channel access to a wireless channel in a shared radio frequency spectrum based at least in part on a first listen before talk procedure that indicates the wireless channel is unused by one or more other transmitters, wherein the first listen before talk procedure provides the channel access for a maximum channel occupancy time duration;

means for transmitting, responsive to gaining the channel access, a first communication to one or more receiving devices via the wireless channel during the maximum channel occupancy time duration;

means for discontinuing transmitting via the wireless channel subsequent to the first communication for at least a duration of a transmission gap;

means for determining that the transmission gap is less than a threshold transmission gap duration; and means for transmitting, subsequent to the transmission gap and in an absence of a second listen before talk procedure, a second communication to the one or more receiving devices during the maximum channel occupancy time duration;

wherein the second communication is transmitted in the absence of the second listen before talk procedure responsive to the transmission gap being less than the threshold transmission gap duration.

23. The apparatus of claim 22, wherein the second communication is transmitted starting at any time during the maximum channel occupancy time duration without performing the second listen before talk procedure.

24. The apparatus of claim 22, wherein the transmission gap is a first transmission gap, the apparatus further comprising:
  means for discontinuing transmitting via the wireless channel subsequent to the second communication for at least a duration of a second transmission gap;
  means for determining that the second transmission gap meets or exceeds the threshold transmission gap duration;
  means for performing the second listen before talk procedure that indicates the wireless channel is unused by one or more other transmitters; and
  means for transmitting a third communication to the one or more receiving devices.

25. The apparatus of claim 24, wherein the second listen before talk procedure monitors for the one or more other transmitters for at least a minimum dwell time.

26. The apparatus of claim 25, wherein the minimum dwell time corresponds to a time period for periodic signal transmissions of devices that use the wireless channel.

27. A non-transitory computer-readable medium storing code for wireless communications, the code comprising instructions executable by a processor to:

gain channel access to a wireless channel in a shared radio frequency spectrum based at least in part on a first listen before talk procedure that indicates the wireless channel is unused by one or more other transmitters, wherein the first listen before talk procedure provides the channel access for a maximum channel occupancy time duration;

transmit, responsive to gaining the channel access, a first communication to one or more receiving devices via the wireless channel during the maximum channel occupancy time duration;

discontinue transmitting via the wireless channel subsequent to the first communication for at least a duration of a transmission gap;

determine that the transmission gap is less than a threshold transmission gap duration; and transmit, subsequent to the transmission gap and in an absence of a second listen before talk procedure, a second communication to the one or more receiving devices during the maximum channel occupancy time duration;

wherein the second communication is transmitted in the absence of the second listen before talk procedure responsive to the transmission gap being less than the threshold transmission gap duration.

* * * * *